US010378877B2

(12) United States Patent
Nagano et al.

(10) Patent No.: US 10,378,877 B2
(45) Date of Patent: Aug. 13, 2019

(54) IMAGE PROCESSING DEVICE, IMAGE PROCESSING METHOD, AND PROGRAM

(71) Applicant: SONY CORPORATION, Tokyo (JP)

(72) Inventors: Hidetoshi Nagano, Kanagawa (JP); Takehiro Hamada, Kanagawa (JP); Hironori Hattori, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 641 days.

(21) Appl. No.: 14/431,885

(22) PCT Filed: Oct. 18, 2013

(86) PCT No.: PCT/JP2013/078273
§ 371 (c)(1),
(2) Date: Mar. 27, 2015

(87) PCT Pub. No.: WO2014/069247
PCT Pub. Date: May 8, 2014

(65) Prior Publication Data
US 2015/0260505 A1 Sep. 17, 2015

(30) Foreign Application Priority Data
Nov. 2, 2012 (JP) .................................. 2012-242409

(51) Int. Cl.
G06T 7/20 (2017.01)
G01B 11/00 (2006.01)
(Continued)

(52) U.S. Cl.
CPC ................ G01B 11/00 (2013.01); G06T 3/00 (2013.01); G06T 7/20 (2013.01); G06T 7/73 (2017.01);
(Continued)

(58) Field of Classification Search
CPC ... G06F 3/011; G06F 3/0346; G06K 9/00221; G06K 9/00335; G06K 9/00369;
(Continued)

(56) References Cited
U.S. PATENT DOCUMENTS

2002/0052709 A1    5/2002  Akatsuka et al.
2008/0240550 A1   10/2008  Morita et al.
(Continued)

FOREIGN PATENT DOCUMENTS

JP    2002-90118 A    3/2002
JP    2005-227929 A   8/2005
(Continued)

OTHER PUBLICATIONS

Office Action dated Aug. 29, 2016 in Chinese Patent Application No. 201380029476.1 (submitting English language translation only).
(Continued)

Primary Examiner — Duy M Dang
(74) Attorney, Agent, or Firm — Oblon, McClelland, Maier & Neustadt, L.L.P.

(57) ABSTRACT

The present disclosure relates to an image processing device that reduces the computation load in image processing, an image processing method, and a program.
A rough-detection component detecting unit detects markers shown in an image. A marker selecting unit selects a predetermined number of markers from among the markers detected by the rough-detection component detecting unit. A specific-detection component detecting unit detects the predetermined number of markers selected by the marker selecting unit in a more specific manner than the rough-detection component detecting unit. An estimating/processing unit estimates positions and postures of the markers based on results of the detection performed by the specific-detection component detecting unit. The present technique
(Continued)

can be applied to an image processing device that combines the background of a person captured by a camera with another background image.

13 Claims, 14 Drawing Sheets

(51) Int. Cl.
    *G06T 3/00* (2006.01)
    *H04N 5/222* (2006.01)
    *H04N 5/272* (2006.01)
    *H04N 5/265* (2006.01)
    *H04N 5/275* (2006.01)
    *G06T 7/73* (2017.01)

(52) U.S. Cl.
    CPC ............... *G06T 7/74* (2017.01); *H04N 5/222* (2013.01); *H04N 5/2224* (2013.01); *H04N 5/265* (2013.01); *H04N 5/272* (2013.01); *H04N 5/275* (2013.01); *G06T 2207/10016* (2013.01); *G06T 2207/30204* (2013.01); *G06T 2207/30208* (2013.01); *G06T 2207/30244* (2013.01)

(58) Field of Classification Search
    CPC ...... G06K 9/3216; G08C 17/00; G08C 17/02; H04N 5/2226
    See application file for complete search history.

(56) References Cited

U.S. PATENT DOCUMENTS

| | | | | |
|---|---|---|---|---|
| 2010/0014750 A1* | 1/2010 | Seko | ................ | G06K 9/3216 382/154 |
| 2010/0283543 A1 | 11/2010 | Shivaram et al. | | |
| 2011/0090343 A1* | 4/2011 | Alt | ................ | G06T 19/006 348/164 |
| 2011/0305368 A1* | 12/2011 | Osako | ................ | G06K 9/3216 382/103 |

FOREIGN PATENT DOCUMENTS

| | | |
|---|---|---|
| JP | 2008-249407 A | 10/2008 |
| JP | 2011-96227 A | 5/2011 |

OTHER PUBLICATIONS

U.S. Appl. No. 14/430,631, filed Mar. 24, 2015, Nagano.
International Search Report dated Nov. 12, 2013 in PCT/JP2013/078273.
Office Action dated Feb. 22. 2018 in Japanese Patent Application No. 2014-544425, 8 pages.

* cited by examiner

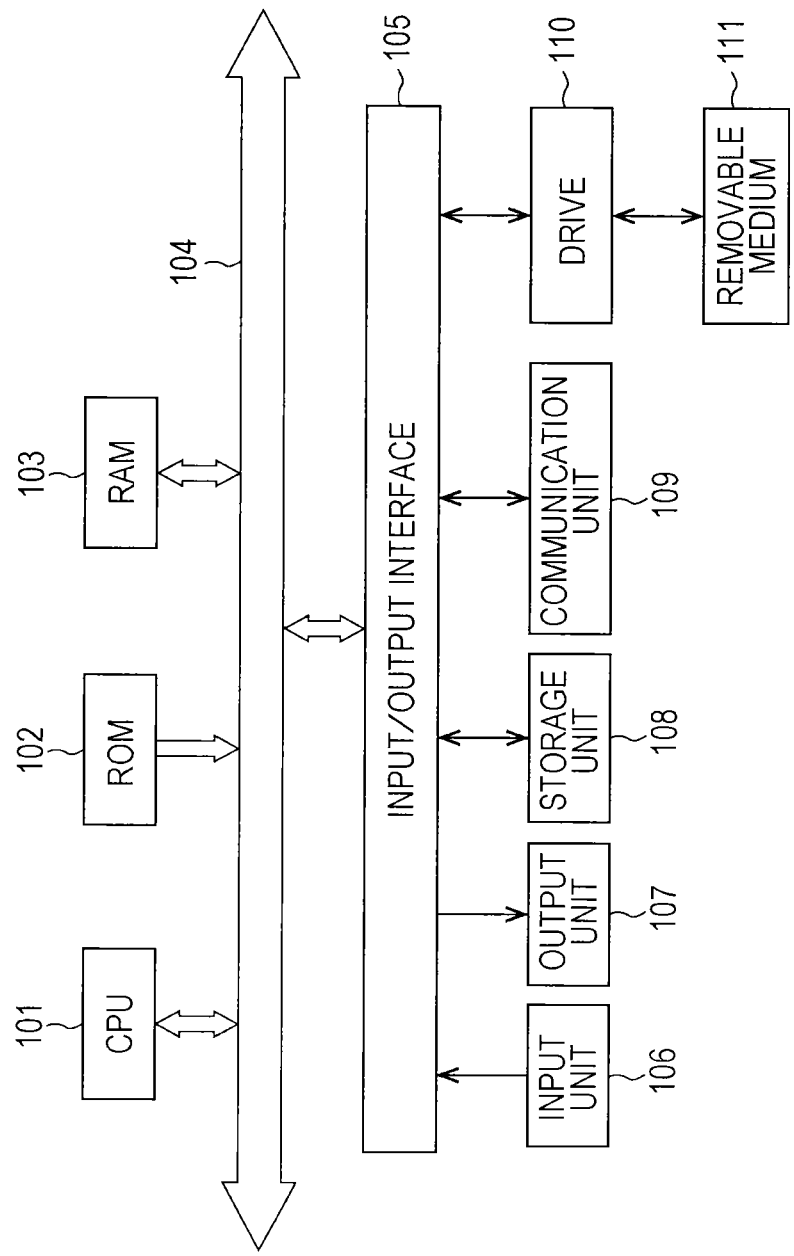

IMAGE PROCESSING DEVICE, IMAGE PROCESSING METHOD, AND PROGRAM

TECHNICAL FIELD

The present disclosure relates to image processing devices, image processing methods, and programs, and more particularly, to an image processing device that is designed to reduce the computation load in image processing, an image processing method, and a program.

BACKGROUND ART

There has been a technique for estimating the position and the posture of a marker in an image by analyzing the image generated by capturing an image of the known marker with a camera, and determining the position and the posture of the marker relative to the camera.

Where the camera is located far from the marker, the marker is shown in a small size in an image. When the camera is moved or rotated, the marker might be located outside the field of view. Therefore, more than one marker is prepared, and measures are taken to show the markers in a relatively large size in the field of view of the camera.

For example, Patent Document 1 discloses a technique for enabling estimation of the position and the posture of a single marker relative to a camera by providing the single marker with a geometric feature. According to this technique, it is possible to switch between a result of estimation of the positions and the postures of markers relative to the camera based on the positions of the markers in an image, and a result of estimation of the position and the posture of a single marker relative to the camera, in accordance with the state of the marker(s) shown in the image.

CITATION LIST

Patent Document

Patent Document 1: Japanese Patent Application Laid-Open No. 2002-90118

SUMMARY OF THE INVENTION

Problems to be Solved by the Invention

In a case where the position and the posture of the camera hardly change as in the calibration of a fixed camera or the like, increase in the number of markers can be restricted to a certain extent by placing markers in appropriate positions. However, in a case where the camera is freely moved, the markers need to be placed relatively densely within the shooting range. Particularly, in a case where a computer graphic image is superimposed on a real image without artificiality by using estimated positions and postures of markers relative to the camera, the results of the estimation need to be highly accurate. As the accuracy in the estimation process to be performed on markers is increased, the computation load becomes larger. With the computational resource in an estimating/processing device, the computation load needs to be reduced.

The present disclosure is made in view of those circumstances, and is to reduce the computation load in image processing.

Solutions to Problems

An image processing device according to one aspect of the present disclosure includes: a first detecting unit that detects a plurality of markers shown in an image; a selecting unit that selects a predetermined number of markers from among the markers detected by the first detecting unit; a second detecting unit that detects the predetermined number of markers selected by the selecting unit in a more specific manner than the first detecting unit; and an estimating unit that estimates positions and postures of the markers based on a result of the detection performed by the second detecting unit.

An image processing method or a program according to the one aspect of the present disclose includes the steps of: detecting a plurality of markers shown in an image; selecting a predetermined number of markers from among the detected markers; detecting the predetermined number of selected markers in a more specific manner; and estimating positions and postures of the markers based on a result of the detection.

In the one aspect of the present disclosure, a plurality of markers shown in an image are detected, a predetermined number of markers are selected from among the detected markers, the predetermined number of selected markers are detected in a more specific manner, and positions and postures of the markers are estimated based on a result of the detection.

Effects of the Invention

According to one aspect of the present disclosure, the computation load in image processing can be reduced.

BRIEF DESCRIPTION OF DRAWINGS

FIG. 14 is a block diagram showing an example structure of an embodiment of a computer to which the present technique is applied.

MODES FOR CARRYING OUT THE INVENTION

The following is a detailed description of specific embodiments to which the present technique is applied, with reference to the drawings.

Figure 1:
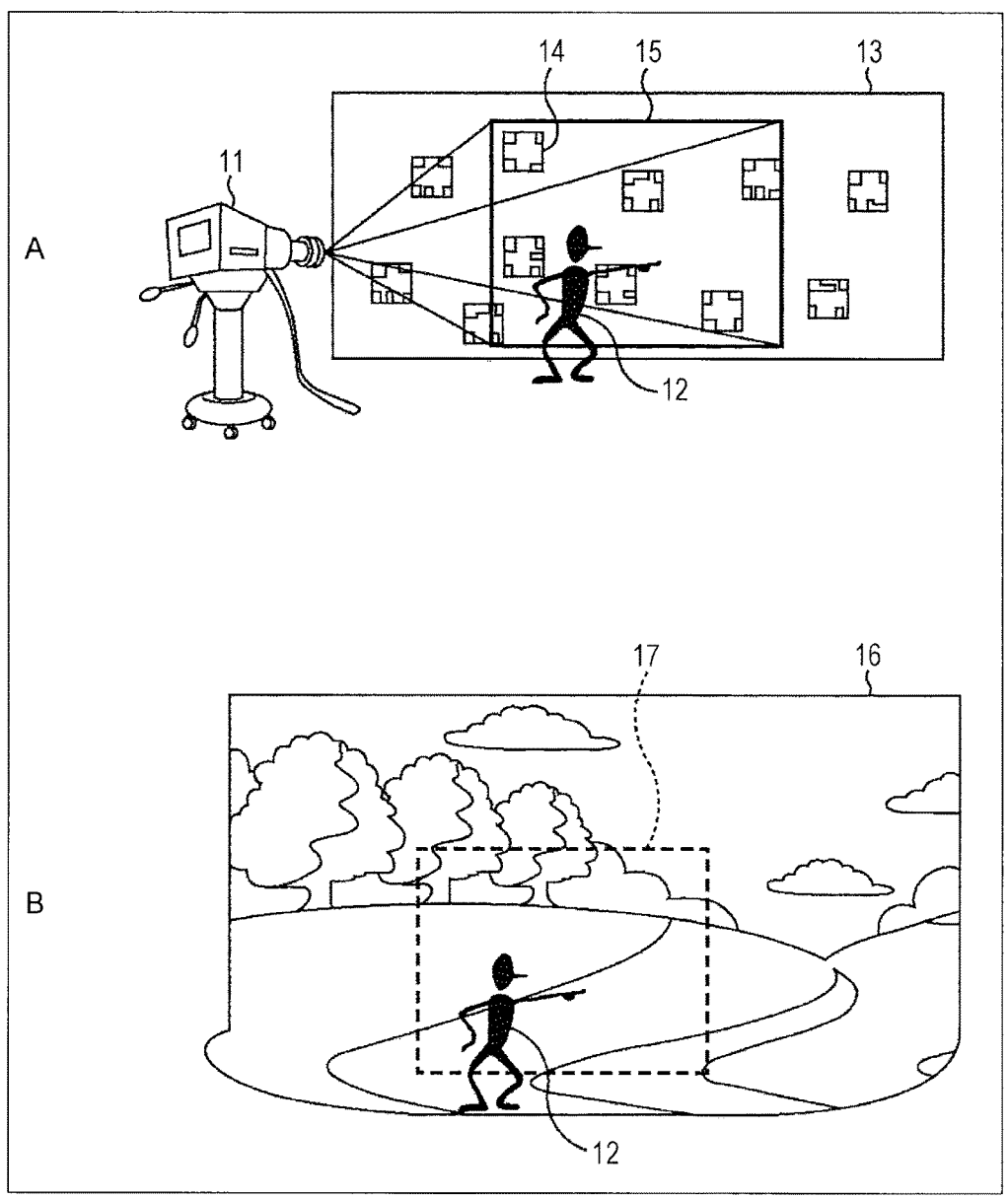
FIG. 1 is a diagram for explaining the image processing for combining the background of a person captured by a camera with another background image.

Referring first to FIG. 1, image processing to combine the background of a person captured by a camera with another background image is described.

Normally, when the camera is fixed, an image of a person standing in front of a so-called blue background is captured, and image processing involving a chroma-key process is performed to replace the blue background portion of the image captured by the camera with a background image. In a case where the camera moves or rotates, the background image needs to be changed in accordance with the motion or rotation of the camera. Therefore, motion and change in the orientation of the camera are acquired, and image processing is performed to replace the blue background portion of the image with a background image in synchronization with the change. However, it would be expensive to prepare a system in which the camera is equipped with a sensor that is capable of detecting motion and change in the orientation of the camera, and background images are changed in accordance with output from the sensor.

In view of this, the following image processing has been developed: markers are placed on a blue background as shown in FIG. 1, motion and change in the orientation of the camera are estimated through image processing, and the blue background portion of the image is replaced with a background image in accordance with the change.

A in FIG. 1 shows a situation where an image of an object is being captured by a camera. B in FIG. 1 shows a synthesis result obtained by attaching a background image through a chroma-key process.

As shown in A in FIG. 1, in a case where a camera 11 captures an image of a person 12 as an object, a blue wall surface 13 is placed behind the person 12, and markers 14 are attached to the wall surface 13. In A in FIG. 1, the rectangle drawn with bold lines represents the range in which an image is to be captured in accordance with the field of view of the camera 11, and the region in the rectangle represents the captured image 15 to be captured by the camera 11. In this case, markers 14 are placed on the wall surface 13 so that a predetermined number or more of markers 14 fall within the captured image 15, and, even if one of the markers 14 moves out of the frame of the captured image 15, some other marker 14 newly enters the frame of the captured image 15.

As the image processing to attach a background image to the entire wall surface 13 is performed with such markers 14, it is possible to generate a synthesis image that hardly shows artificiality even when the camera 11 moves or rotates.

As a result of such image processing, a background image 16 is attached to the wall behind the person 12, as shown in B in FIG. 1. In B in FIG. 1, the region indicated by the rectangle drawn with dashed lines represents an output image 17 to be output as a result of the image processing performed on the captured image 15 captured by the camera 11. The background image 16 is attached to a larger region than the output image 17. When the camera 11 moves or rotates, the output image 17 also moves, and the background image 16 shown together with the person 12 in the output image 17 changes. Accordingly, a natural output image can be obtained.

So as to output such an output image 17, the positions of the markers 14 in the captured image 15 captured by the camera 11 should be accurately acquired, and image processing needs to be performed to attach the background image 16 to the wall surface 13 in accordance with the positions of the markers 14. In the description below, distortion of the lens of the camera 11 is recognized in advance, and the distortion is not taken into consideration.

For example, relationships between points $(u_i, v_i)$ in the plane of the wall surface 13 behind the person 12 and points $(x_i, y_i)$ in the plane of the background image 16 can be represented by a (3×3) homography matrix H expressed by the equation (1) shown below using homogeneous coordinate system expression. In the equation (1), $(w_i u_i, w_i v_i, w_i)$ are homogeneous coordinates of $(u_i, v_i)$.

[Mathematical Formula 1]

$$\begin{bmatrix} w_i u_i \\ w_i v_i \\ w_i \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} x_i \\ y_i \\ 1 \end{bmatrix} \qquad (1)$$

Here, the elements $h_{0\,0}$ through $h_{2\,2}$ of the homography matrix H have a degree of freedom in the constant factor. Where $h_{2\,2}=1$, and $h_{0\,0}$ through $h_{2\,1}$ are sorted out by eliminating $w_i$, for example, the equation (1) transforms into the following equation (2).

[Mathematical Formula 2]

$$\begin{bmatrix} x_i & y_i & 1 & 0 & 0 & 0 & -u_i x_i & -u_i y_i \\ 0 & 0 & 0 & x_i & y_i & 1 & -v_i x_i & -v_i y_i \end{bmatrix} \begin{bmatrix} h_{00} \\ h_{01} \\ h_{02} \\ h_{10} \\ h_{11} \\ h_{12} \\ h_{20} \\ h_{21} \end{bmatrix} = \begin{bmatrix} u_i \\ v_i \end{bmatrix} \qquad (2)$$

If there are four or more relationships between the points $(u_i, v_i)$ in the plane of the wall surface 13 and the points $(x_i, y_i)$ in the plane of the background image 16 according to the equation (2), the homography matrix H can be calculated. Accordingly, the homography matrix H can be calculated by attaching four markers 14 (i=0, 1, 2, 3) to the wall surface 13, and detecting the coordinates $(x_i, y_i)$ corresponding to the positions of these markers 14 in the background image 16 and the positions $(u_i, v_i)$ of the markers 14 in the captured image 15. Here, the equation (3) shown below is obtained by transforming the above equation (1).

[Mathematical Formula 3]

$$\begin{bmatrix} w_i/w_i \\ y_i/w_i \\ 1/w_i \end{bmatrix} = \begin{bmatrix} h_{00} & h_{01} & h_{02} \\ h_{10} & h_{11} & h_{12} \\ h_{20} & h_{21} & h_{22} \end{bmatrix}^{-1} \begin{bmatrix} u_i \\ v_i \\ 1 \end{bmatrix} \qquad (3)$$

Using this equation (3), the image processing to attach the background image 16 to the background portion in the output image 17 can be performed. Specifically, the coordinates (u, v) of the pixels to which the background image 16 is to be attached in the output image 17 are colored with the pixel values of the pixel coordinates (x, y) in the background image 16. With expansion/contraction and quantization errors being taken into account, many pixel values filtered with the values of pixels located in the vicinity of the pixels to be processed are normally used.

The image processing described above is conventionally performed, but the computation load needs to be reduced as described above.

The positions of simple markers 14 are detected on a pixel basis. Furthermore, the captured image 15 includes noise, and there might be detection errors in detected positions. As a result, the accuracy in attaching the background image obtained according to the equation (3) becomes lower. Particularly, the errors caused in the detected positions by the noise vary with time. As a result, the background in the output image 17 slightly shakes, and the quality of the output image 17 becomes lower.

To counter such decrease in the quality of the output image 17, it is necessary to use a marker position detecting method that is not affected by noise or quantization errors. It is generally believed that noise can be canceled and quantization errors can be reduced by increasing the detection points (feature points such as corners, or the center points of blocks in block matching, for example) for detecting the positions of the markers 14, and determining a highly-accurate homography matrix H from a large number of detection points based on the method of least squares or the like.

There are cases where the markers 14 move out of the field of view when the camera 11 moves or rotates, and disappear from the captured image 15. In a case where the markers 14 are placed only in the center of the screen so as to cope with panning of the camera 11, for example, the influence of errors in the detected positions of the markers 14 is larger at greater distances from the markers 14. Therefore, the shake of the background is greater at the edge portions of the output image 17.

To counter this problem, the number of markers 14 is increased, and the markers 14 are densely attached to the entire wall surface 13 so that a necessary number or more of the markers 14 constantly appear in the captured image, as shown in A in FIG. 1. However, in a case where the number of markers 14 is simply increased, the processing load in the detection increases with the number of markers 14. In view of this, there is a demand for restraint on the increase in the load.

Therefore, the present technique aims to improve the accuracy in detecting the positions of the markers 14, and restrain the increase in the computation load due to changes in the position and the orientation of the camera 11.

Figure 2:
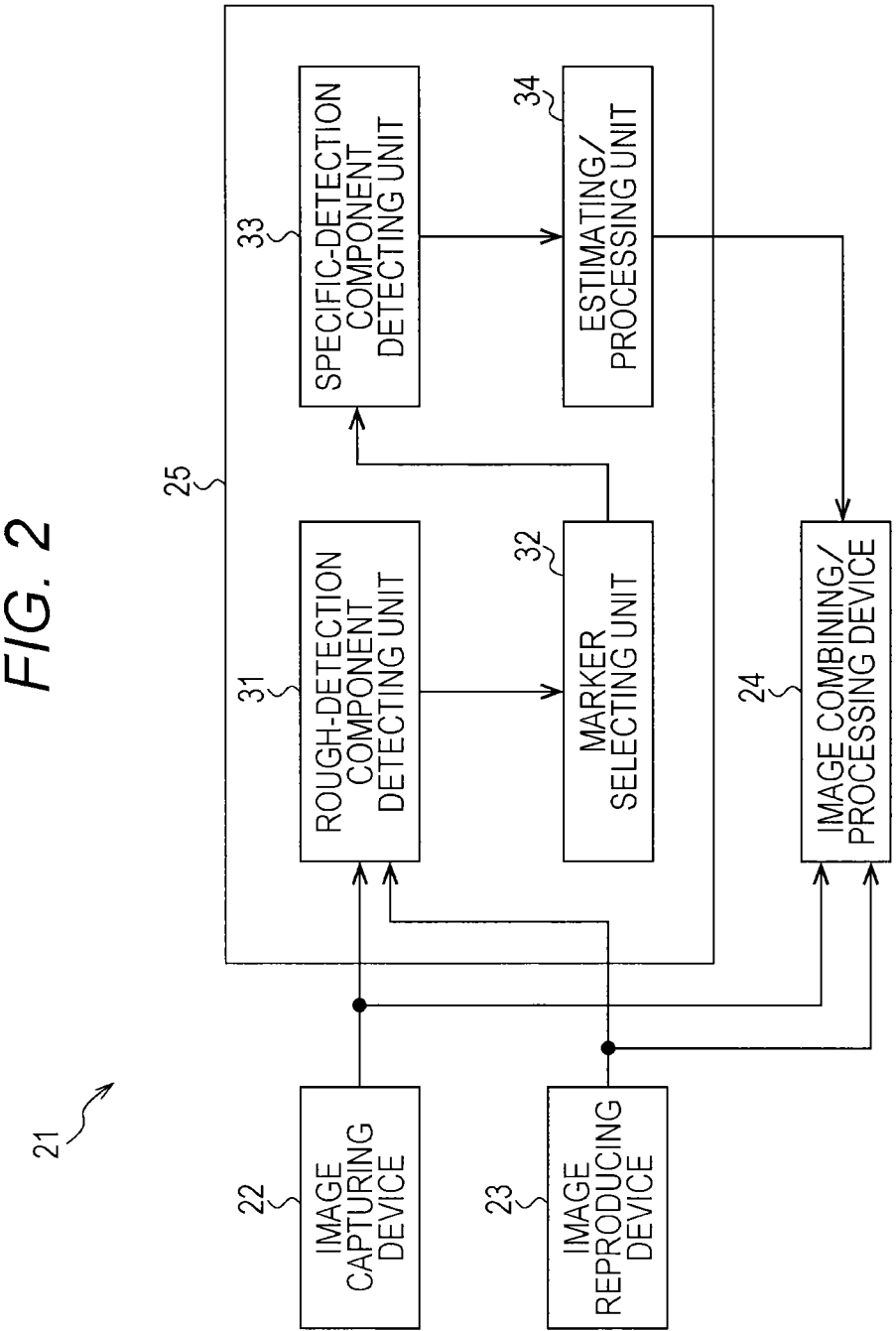
FIG. 2 is a block diagram showing an example structure of a first embodiment of an image processing system to which the present technique is applied.

FIG. 2 is a block diagram showing an example structure of a first embodiment of an image processing system to which the present technique is applied.

In FIG. 2, an image processing system 21 includes an image capturing device 22, an image reproducing device 23, an image combining/processing device 24, and a marker position estimating unit 25.

The image capturing device 22 is equivalent to the camera 11 in FIG. 1, and supplies the captured image 15 including the markers 14 to be used in the combining process, to the image combining/processing device 24 and the marker position estimating unit 25. In the image processing system 21, real-time image processing is performed on the captured image 15 taken with the image capturing device 22, or the captured image 15 already taken is reproduced by the image reproducing device 23 and is then supplied to the image combining/processing device 24 and the marker position estimating unit 25 so that image processing can be performed.

Based on the positions and postures of the markers 14 estimated by the marker position estimating unit 25, the image combining/processing device 24 performs the image combining process to paste the background image 16 onto the background of the person 12 shown in the captured image 15 supplied from the image capturing device 22 or the image reproducing device 23.

The marker position estimating unit 25 includes a rough-detection component detecting unit 31, a marker selecting unit 32, a specific-detection component detecting unit 33, and an estimating/processing unit 34, and estimates the positions of the markers 14 shown in the captured image 15 supplied from the image capturing device 22 or the image reproducing device 23.

Using the rough-detection components of the markers 14, the rough-detection component detecting unit 31 performs rough detection of the markers 14 in a detection process with a small computation load. Using the rough-detection components of the markers 14, the rough-detection component detecting unit 31 also detects, from the markers 14, marker IDs (Identifications) that are the information for identifying the respective markers 14.

From among the markers 14 detected from the entire captured image 15 by the rough-detection component detecting unit 31, the marker selecting unit 32 selects a predetermined number of markers 14 to be subjected to the specific detection by the specific-detection component detecting unit 33. For example, the marker selecting unit 32 selects the predetermined number of markers 14 determined by the processing load, the computing power, the processing speed, and the like of the specific-detection component detecting unit 33. The marker selecting unit 32 also selects the predetermined number of markers 14, taking into account the types of the markers 14 shown in the captured image 15 and the positions of the markers 14 on the screen.

Using the specific-detection components of the markers 14, the specific-detection component detecting unit 33 performs specific detection of the markers 14 in a detection process that requires a large computation load but has a high location accuracy.

The estimating/processing unit 34 estimates the positions and the postures of the markers 14 by calculating the above described homography matrix H from a result of the specific detection of the markers 14 performed by the specific-detection component detecting unit 33. The image combining/processing device 24 then combines images based on the positions and the postures of the markers 14 estimated by the estimating/processing unit 34.

The markers 14 used in the image processing system 21 include rough-detection components and specific-detection components.

Figure 3:
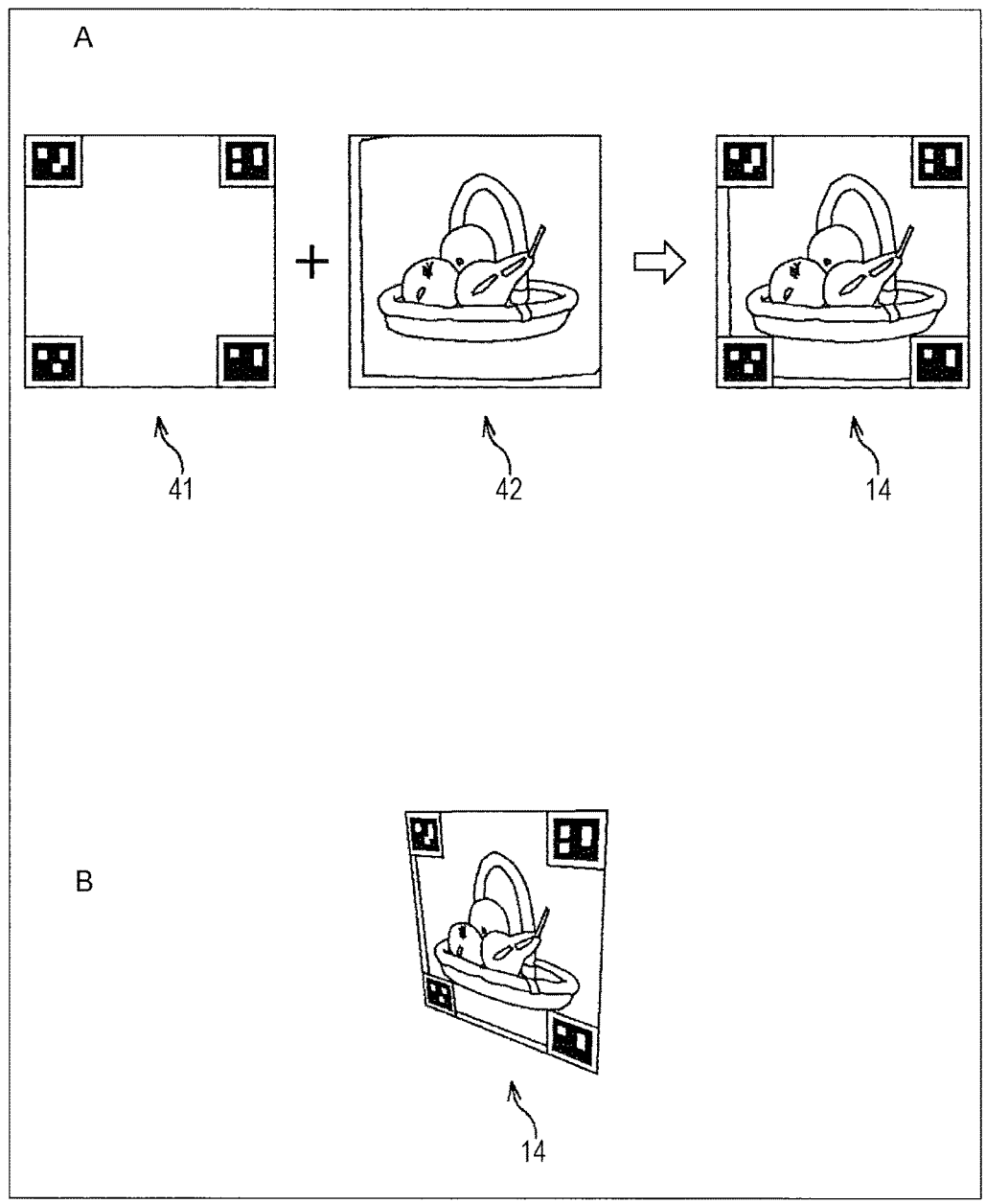
FIG. 3 is a diagram showing an example of a marker to be used in the image processing system.

FIG. 3 shows an example of a marker 14 used in the image processing system 21.

As shown in A in FIG. 3, a marker 14 has a structure that is formed by superimposing a rough-detection image 41 having two-dimensional codes as rough-detection components at the four corners on a natural image as a specific-detection image 42 so that the two kinds of components spatially coexist. B in FIG. 3 shows only the marker 14 cut out from an image generated by capturing the marker 14 from an oblique direction.

The rough-detection image 41 is an image that does not include a fine pattern like a two-dimensional code, and can be detected in a relatively stable manner even when captured at a long distance from the camera 11 and shown as a small image. Also, even in a case where the marker 14 is captured from an oblique direction or where an image subjected to projective transform is obtained as the camera 11 does not squarely face the marker 14, as shown in B in FIG. 3, the rough-detection image 41 can reduce the influence of the distortion caused by the projective transform.

Furthermore, the rough-detection image 41 can reduce the load of the detection process, and is a detection index suitable for rough-detection components. The rough-detection image 41 also serves as suitable rough-detection components when generated as a large image or captured from the front.

The marker ID for identifying the marker 14 is embedded in the two-dimensional codes in the rough-detection image 41, and the rough-detection component detecting unit 31 detects and outputs the marker ID from the two-dimensional codes of the marker 14. The marker ID is to be used in determining to which position on the wall surface 13 behind the person 12 the marker 14 is attached.

Image transform using the four center points of the respective two-dimensional codes is performed on the rough-detection image 41 captured from an oblique direction, and rough correction is performed to transform the rough-detection image 41 into an image as if the image of the marker 14 were captured from the front.

Figure 4:
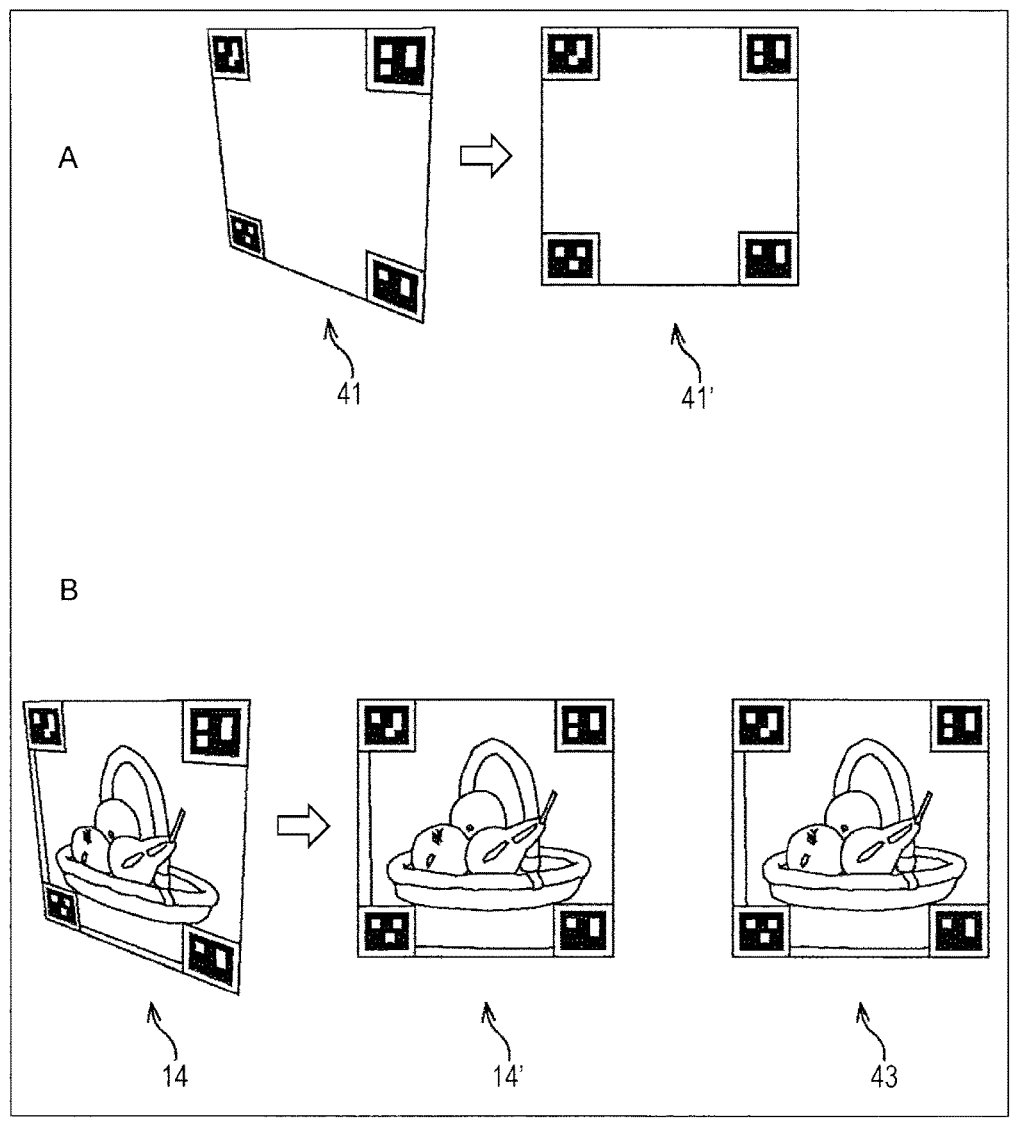
FIG. 4 is a diagram for explaining rough correction and matching of markers.

Specifically, through the rough correction, the rough-detection image 41 shown on the left side in A in FIG. 4 is transformed into a rough-detection image 41' shown on the right side in A in FIG. 4. This transform does not necessarily use the four center points of the respective two-dimensional codes of the rough-detection image 41, and may involve any positions.

The transform shown in A in FIG. 4 can be performed by obtaining the pixel value of the uncorrected rough-detection image 41 in the following manner. A homography matrix H' is determined according to the above equation (2), so that $(u_i, v_i)$ is calculated according to the equation (4) shown below with respect to the coordinates $(u_i', v_i')$ in the corrected rough-detection image 41'.

[Mathematical Formula 4]

$$\begin{bmatrix} w_i' u_i \\ w_i' v_i \\ w_i' \end{bmatrix} = \begin{bmatrix} h_{00}' & h_{01}' & h_{02}' \\ h_{10}' & h_{11}' & h_{12}' \\ h_{20}' & h_{21}' & h_{22}' \end{bmatrix} \begin{bmatrix} u_i' \\ v_i' \\ 1 \end{bmatrix} \quad (4)$$

When the marker 14 is actually corrected with the rough-detection image 41, the marker 14 shown on the left side in B in FIG. 4 is corrected and turned into the marker 14' shown in the center of B in FIG. 4. Since the correction performed here uses the rough-detection image 41, a small amount of projective components remains, and therefore, the marker 14' is slightly different from the marker original image 43 (the image from which the marker 14 originates) shown on the right side in B in FIG. 4.

In view of this, in the marker position estimating unit 25, the specific-detection component detecting unit 33 performs a detection process using specific components.

The specific-detection component detecting unit 33 performs block matching on the specific points in a natural image at the resolution of the marker original image 43. A natural image is a pattern in which fine matching can be performed at a large number of points, and a matching process can be stably performed. However, the detection process by the specific-detection component detecting unit 33 is not limited to a natural image and block matching.

As the specific points (a large number of points that are hardly mistaken for the periphery in block matching) are detected from the marker 14 or the marker 14', the marker 14' has a higher degree of block consistency with the marker original image 43 and can lead to a search result with much higher accuracy, compared with the marker 14 subjected to the projective transform to a greater extent.

Therefore, the specific-detection component detecting unit 33 corrects the marker 14 captured with the use of a result of detection performed by the rough-detection component detecting unit 31, and performs matching between the marker 14' and the marker original image 43. Accordingly, the accuracy in detecting the specific-detection components can be increased.

Figure 5:
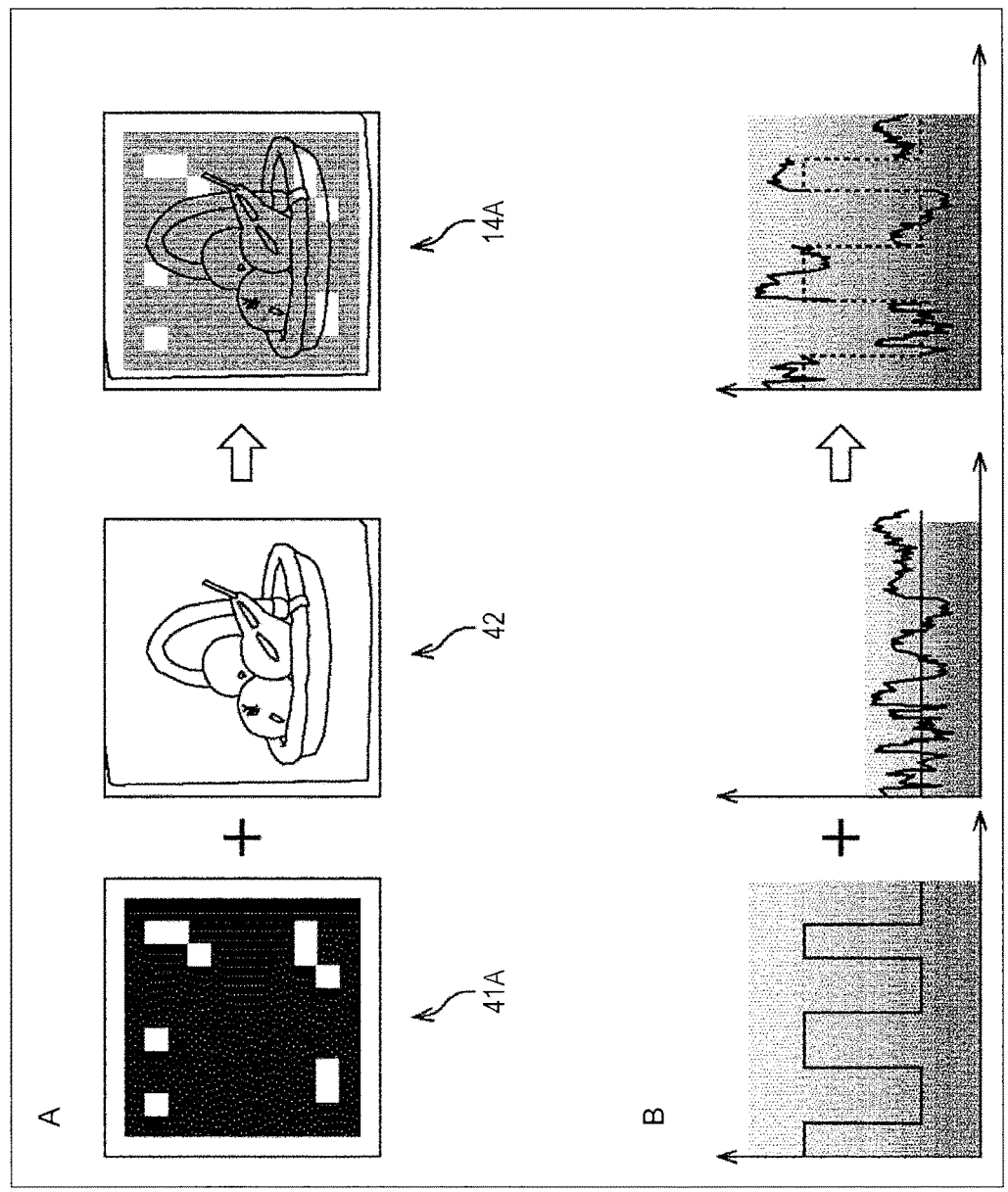
FIG. 5 is a diagram showing a modification of a marker.

FIG. 5 shows a modification of the marker 14.

In FIG. 5, a marker 14A in which a rough-detection image 41A and the specific-detection image 42 are mixed by modulation is shown.

Specifically, the rough-detection image 41A having two-dimensional codes as rough-detection component scattered over the entire marker 14A is shown on the left side in A in FIG. 5. The marker 14A can be obtained by modulating the specific-detection image 42 shown in the center of A in FIG. 5 with the rough-detection image 41A. The marker 14A hardly disappears even when reduced in size as the rough-detection component detecting unit 31 performs rough-detection of the markers 14A.

For example, B in FIG. 5 shows modulation (one-dimensional representation) of the rough-detection image 41A and the specific-detection image 42, and a situation where specific component modulation is performed on the two-dimensional codes of the rough-detection components with respect to a line parallel to the x-axis on the marker 14A. When the two-dimensional codes of the rough-detection image 41A are modulated with the specific-detection components (a natural image) of the specific-detection image 42, the marker 14A that is a two-dimensional code in a large sense but is modulated so as to include the specific-detection components can be created.

Although the tone of the specific-detection components of the specific-detection image 42 is limited to a half or lower, the specific-detection components can be superimposed without affecting the reference luminance determination in the rough-detection process by the rough-detection component detecting unit 31. After the two-dimensional codes are recognized from a result of the rough detection, the specific-detection component can be restored by subtracting the two-dimensional code components. Accordingly, a specific detection process can be performed on the specific-detection image 42 with the specific-detection components. Alternatively, the four corners of the roughly detected two-dimensional codes, the corner points on the two-dimensional codes, or the like can be used in the rough correction described above with reference to FIG. 4.

Figure 6:
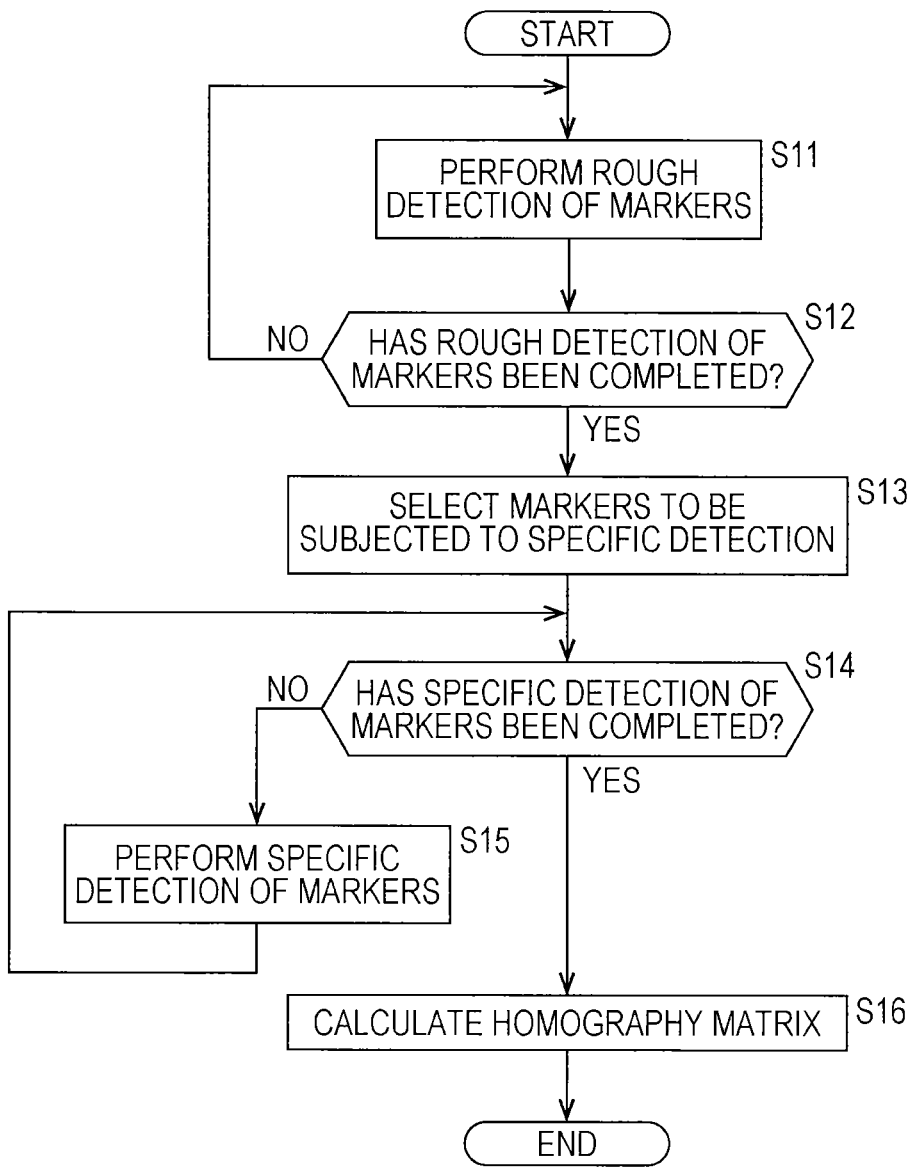
FIG. 6 is a flowchart for explaining a marker position estimating process.

Referring now to the flowchart in FIG. 6, the marker position estimating process to be performed by the marker position estimating unit 25 is described. When the captured image 15 is supplied from the image capturing device 22 or the image reproducing device 23, the marker position estimating unit 25 starts the marker position estimating process, and performs the marker position estimating process for each frame of the captured image 15.

In step S11, using the rough-detection components of the markers 14, the rough-detection component detecting unit 31 performs the rough detection of the markers 14 to roughly detect the markers 14 from the captured image 15 by a method that relatively restrains increase in the computation load. For example, the rough-detection component detecting unit 31 detects the rough-detection image 41 by binarizing the captured image 15 and scanning all the white frames of the two-dimensional codes. In this manner, the markers 14 are roughly detected. Also, the rough-detection component detecting unit 31 can perform a process that has a low location accuracy but is relatively resistant to distortion and requires only a small computation load by performing the process with the resolution of the captured image 15 being reduced.

In step S12, the rough-detection component detecting unit 31 determines whether the rough detection of the markers 14 has been completed. If it is determined that the rough detection of the markers 14 has not been completed yet, the process returns to step S11. For example, if the rough-detection component detecting unit 31 detects all the markers 14 shown in the captured image 15, the rough-detection component detecting unit 31 determines that the rough detection of the markers 14 has been completed. That is, the procedure in step S11 is repeated until all the markers 14 shown in the captured image 15 are detected.

If the rough-detection component detecting unit 31 in step S12 determines that the rough detection of the markers 14 has been completed, the process moves on to step S13.

In step S13, from among the markers 14 detected by the rough-detection component detecting unit 31 in step S11, the marker selecting unit 32 selects a predetermined number of markers 14 to be subjected to the specific detection by the specific-detection component detecting unit 33. The process to be performed by the marker selecting unit 32 to select the markers 14 will be described later with reference to FIG. 7.

In step S14, the specific-detection component detecting unit 33 determines whether the specific detection of the markers 14 has been completed. For example, if the specific detection is performed on all the predetermined number of markers 14 selected by the marker selecting unit 32 as the markers to be subjected to the specific detection in step S13, the specific-detection component detecting unit 33 determines that the specific detection of the markers 14 has been completed.

If the specific-detection component detecting unit 33 in step S14 determines that the specific detection of the markers 14 has not been completed yet, the process moves on to step S15.

In step S15, using the specific-detection components of the markers 14, the specific-detection component detecting unit 33 performs the specific detection of the markers 14 to specifically detect the markers 14 from the captured image 15.

For example, as described above with reference to B in FIG. 4, the specific-detection component detecting unit 33 determines the relationships between the coordinates $(x_i, y_i)$ of a large number of specific points in the marker original image 43 and the coordinates $(u_i, v_i)$ of the markers 14, the large number of specific points having been obtained as a result of matching between the marker original image 43 and the markers 14' generated by roughly correcting the markers 14. This relationships are determined by calculating the coordinates $(u_i, v_i)$ of the markers 14, using the transform expressed by the above equation (4) on the coordinates $(u_i', v_i')$ of the specific points of the markers 14' with respect to the specific points $(x_i, y_i)$ in the marker original image 43. Accordingly, the specific-detection component detecting unit 33 outputs, as a result of the specific detection of the markers 14, the correspondence relationships between the coordinates $(u_i, v_i)$ of the large number of specific points as the specific components in the markers 14 in the captured image 15 and the coordinates $(x_i, y_i)$ in the marker original image 43.

After the procedure in step S15, the process returns to step S14, and the procedure in step S15 is repeated until the specific detection of the markers 14 is determined to have been completed in step S14. If the specific detection of the markers 14 is determined to have been completed in step S14, the process moves on to step S16.

In step S16, the estimating/processing unit 34 estimates the positions and the postures of the markers 14 by calculating the homography matrix H.

An example case where the specific-detection component detecting unit 33 outputs the correspondence relationships between the coordinates $(u_i, v_i)$ of the large number of specific points as the specific components in the markers 14 in the captured image 15 and the coordinates $(x_i, y_i)$ in the marker original image 43 as described above is now described.

With the marker IDs of the markers 14 detected by the rough-detection component detecting unit 31, the estimating/processing unit 34 calculates the coordinates of the markers 14 detected by the specific-detection component detecting unit 33 in the background image 16, to transform the coordinates $(x_i, y_i)$ in the marker original image 43 into the coordinates $(X_i, Y_i)$. By performing such a transform process on all the markers 14 detected by the specific-detection component detecting unit 33, the estimating/processing unit 34 obtains a large number of correspondence relationships between the coordinates $(X_i, Y_i)$ in the background image 16 and the coordinates $(u_i, v_i)$ in the captured image 15.

Where the number of correspondence relationships is represented by N, and the homography matrix to be eventually output is represented by H, the relationships among a $((2N) \times 8)$ matrix A, a vector h having eight elements of the homography matrix H, and a vector b having 2N elements generated by sequentially arranging the coordinates $(u_i', v_i')$ in the captured image 15 are expressed by the following equation (5).

[Mathematical Formula 5]

$$Ah = b \quad (5)$$

Here, like the equation (4), the equation (5) is an excess equation in which the number of equations is larger than the number of the elements in the unknown h, and the vector h that minimizes the square error expressed by the equation (6) below can be determined by using a substitution matrix $A^t$ of the matrix A as expressed by the equation (7) below.

[Mathematical Formula 6]

$$E = \|Ah - b\|^2 \quad (6)$$

[Mathematical Formula 7]

$$h = (A^t A)^{-1} A^t b \quad (7)$$

In step S16, the estimating/processing unit 34 calculates and outputs the homography matrix H as the final output.

In the above described manner, the marker position estimating process is performed by the marker position estimating unit 25. In this case, as the markers 14 shown in the captured image 15 in step S15 are roughly corrected with a result of the detection performed with the rough-detection components in step S11, the accuracy in detecting the specific-detection components can be increased.

In the procedure in step S15, the specific-detection component detecting unit 33 may output, as a result of detection, the homography matrix H representing the coordinate transform between the marker original image 43 and the captured image 15.

That is, as described above with reference to FIG. 4, results of matching with respect to the large number of specific points are obtained from the marker original image 43 and the markers 14' generated by correcting the markers 14 shown in the captured image 15. With this, the specific-detection component detecting unit 33 determines a homography matrix H" between the marker original image 43 and the markers 14' by the method of least squares, and sets the homography matrix H" as a result of detection.

Where the number of specific points from which matching results are obtained is represented by N, for example, the above equation (2) is expressed by the following equation (8) involving a $((2N) \times 8)$ matrix A, a vector h" having eight elements of the homography matrix H", and a vector b having 2N elements generated by sequentially arranging the coordinates $(u_1', v_i')$ of the N specific points in the markers 14'.

[Mathematical Formula 8]

$$Ah'' = b \quad (8)$$

Here, the equation (8) is an excess equation in which the number of equations is larger than the number of the elements in the unknown h", and the vector h" that minimizes the square error expressed by the equation (9) below can be determined by using a substitution matrix $A^t$ of the matrix A as expressed by the equation (10) below.

[Mathematical Formula 9]

$$E = \|Ah'' - b\|^2 \quad (9)$$

[Mathematical Formula 10]

$$h'' = (A^t A)^{-1} A^t b \quad (10)$$

With the homography matrix H" obtained in the above manner, the relationships between the coordinates $(u_i', v_i')$ of the N specific points in the markers 14' and the coordinates $(x_i, y_i)$ of the N specific points in the marker original image 43 are expressed by the following equation (11), as in the above described equation (1).

[Mathematical Formula 11]

$$\begin{bmatrix} w_i'' u_i' \\ w_i'' v_i' \\ w_i'' \end{bmatrix} = \begin{bmatrix} h_{00}'' & h_{01}'' & h_{02}'' \\ h_{10}'' & h_{11}'' & h_{12}'' \\ h_{20}'' & h_{21}'' & h_{22}'' \end{bmatrix} \begin{bmatrix} x_i \\ y_i \\ 1 \end{bmatrix} \quad (11)$$

Further, the equation (12) shown below can be obtained by multiplying the above equation (4) by $w_i''$ and substituting the resultant equation into the equation (11).

[Mathematical Formula 12]

$$\begin{bmatrix} w_i'' w_i' u_i \\ w_i'' w_i' v_i \\ w_i'' w_i' \end{bmatrix} = \begin{bmatrix} h_{00}' & h_{01}' & h_{02}' \\ h_{10}' & h_{11}' & h_{12}' \\ h_{20}' & h_{21}' & h_{22}' \end{bmatrix} \begin{bmatrix} h_{00}'' & h_{01}'' & h_{02}'' \\ h_{10}'' & h_{11}'' & h_{12}'' \\ h_{20}'' & h_{21}'' & h_{22}'' \end{bmatrix} \begin{bmatrix} x_i \\ y_i \\ 1 \end{bmatrix} \quad (12)$$

The product H'H" of the homography matrix H determined in the above manner is output as the homography matrix H of the markers 14 from the specific-detection component detecting unit 33.

The process to be performed in step S16 in a case where the specific-detection component detecting unit 33 outputs the homography matrix H as a detection result in step S15 in FIG. 6 is now described.

In accordance with the homography matrix H output in step S15 and the marker IDs of the markers 14 detected by the rough-detection component detecting unit 31 in step S11, the coordinates $(x_i, y_i)$ of the respective markers 14 in the marker original image 43 and the coordinates $(X_i, Y_i)$ of the respective markers 14 in the background image 16 are expressed by the following equation (13).

[Mathematical Formula 13]

$$\begin{bmatrix} w_i^0 x_i \\ w_i^0 y_i \\ w_i^0 \end{bmatrix} = \begin{bmatrix} g_{00} & g_{01} & g_{02} \\ g_{10} & g_{11} & g_{12} \\ g_{20} & g_{21} & g_{22} \end{bmatrix} \begin{bmatrix} X_i \\ Y_i \\ 1 \end{bmatrix} \quad (13)$$

In the equation (13), $g_{2\,0} = g_{2\,1} = 0$, $g_{2\,2} = 1$, and $w^0_i = 1$ in many cases. Also, in the equation (13), the matrix G differs among the markers 14, and an equation (14) using the homography matrix H determined for each of the markers 14 in step S15 can be obtained.

[Mathematical Formula 14]

$$\begin{bmatrix} w_i u_i \\ w_i v_i \\ w_i \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} g_{00} & g_{01} & g_{02} \\ g_{10} & g_{11} & g_{12} \\ g_{20} & g_{21} & g_{22} \end{bmatrix} \begin{bmatrix} X_i \\ Y_i \\ 1 \end{bmatrix} \quad (14)$$

If the product of the matrix H and the matrix G of the equation (14) obtained for each marker 14 is constant, except for differences in the constant factor, the product is the final homography matrix H to be output in step S16. However, the product is normally not constant, and therefore, a matching process needs to be performed.

In the matching process, if the results of the specific detection process in step S15 for the respective markers 14 are equally reliable, for example, representative point positions $(x_i, y_i)$ are prepared for each marker 14, an excess equation equivalent to the above equation (5) is established from the relationships with $(u_i, v_i)$ obtained according to the equation (14), and the final homography matrix H is calculated by the method of least squares.

If the reliability varies among the markers 14, on the other hand, the number of representative points is increased or decreased in accordance with the reliability, the above equation (5) is established, and the final homography matrix H is then calculated by the method of least squares.

Figure 7:
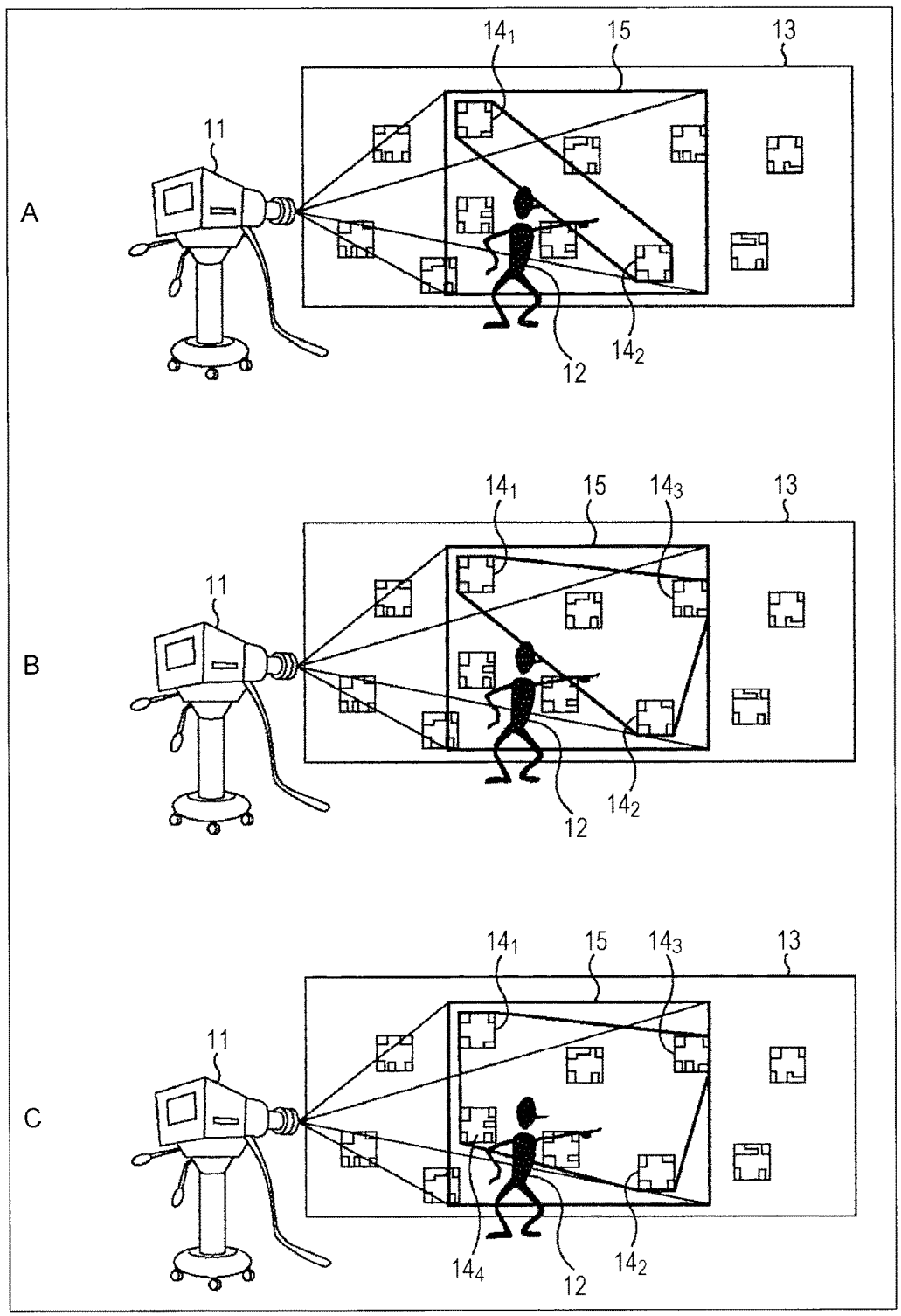
FIG. 7 is a diagram for explaining a predetermined number of markers selected as the markers to be subjected to specific detection.

Referring now to FIG. 7, a predetermined number of markers 14 selected by the marker selecting unit 32 as the markers to be subjected to specific detection are described.

For example, in a case where six markers 14 are shown in the captured image 15 in the field of view of the camera 11, as shown in FIG. 1, the computation load increases if all the markers 14 are subjected to the specific detection. Therefore, so as to restrain increase in the computation load, the marker selecting unit 32 selects a predetermined number of markers 14 to be subjected to the specific detection from among the six markers 14. In FIG. 1, part of the seventh marker 14 is included in the captured image 15 at a lower left portion.

In such a situation, a predetermined number of markers 14 are selected as the markers to be subjected to the specific detection. The number of markers 14 to be used in calculating the homography matrix H representing the relationship between the captured image 15 and the background image 16 is described below with reference to FIG. 7.

First, as described above in regard to the increase of the accuracy in detecting marker positions, the homography matrix H representing the relationship between the background image 16 and the captured image 15 can be calculated even with a single marker 14, if the single marker 14 is a marker 14 according to this embodiment. However, with a single marker 14, the influence of a calculation error becomes larger as the distance from the marker 14 becomes greater. Therefore, the size of the marker 14 is preferably small in a relative sense, with the installation of the marker 14 being taken into consideration. Also, in a case where the relationship between markers 14 is measured at the time of installation of the markers 14, more accurate calculation can be performed by installing the markers 14 in positions distant from each other than by making the markers 14 larger in size.

With these aspects being taken into consideration, in a case where two markers 14 are used, it is preferable to select markers $14_1$ and $14_2$ that are farthest from each other, as shown in A in FIG. 7. With the size of the markers 14 being taken into consideration, the markers 14 are selected so that the area of the polygon surrounding the markers 14 is maximized.

In a case where three markers 14 are used, it is preferable to select the three markers $14_1$, $14_2$, and $14_3$ so that the area of the polygon surrounding the three markers $14_1$, $14_2$, and $14_3$ located at the corners of the polygon is maximized, as shown in B in FIG. 7.

Further, in a case where four markers 14 are used, the four markers $14_1$, $14_2$, $14_3$, and $14_4$ located at the corners of the polygon should be selected as shown in B in FIG. 7. If more markers 14 than that are selected, increase in the computation accuracy cannot be expected, though the computation load increases.

If there is some spare computational resource, a process involving specific-detection components may be performed on all the markers 14 shown in the captured image 15. However, with zooming or the like by the camera 11 being taken into consideration, smaller markers 14 can be placed near the background of the person 12 (such as the leading actor), and a reduction in the number of markers in a wide-angle operation is highly effective.

As described above, in the marker position estimating unit 25, the marker selecting unit 32 divides the marker detection process into the two steps of rough-detection component detection and specific-detection component detection, and selects necessary markers between the two steps. Accordingly, the processing load can be reduced.

Figure 8:
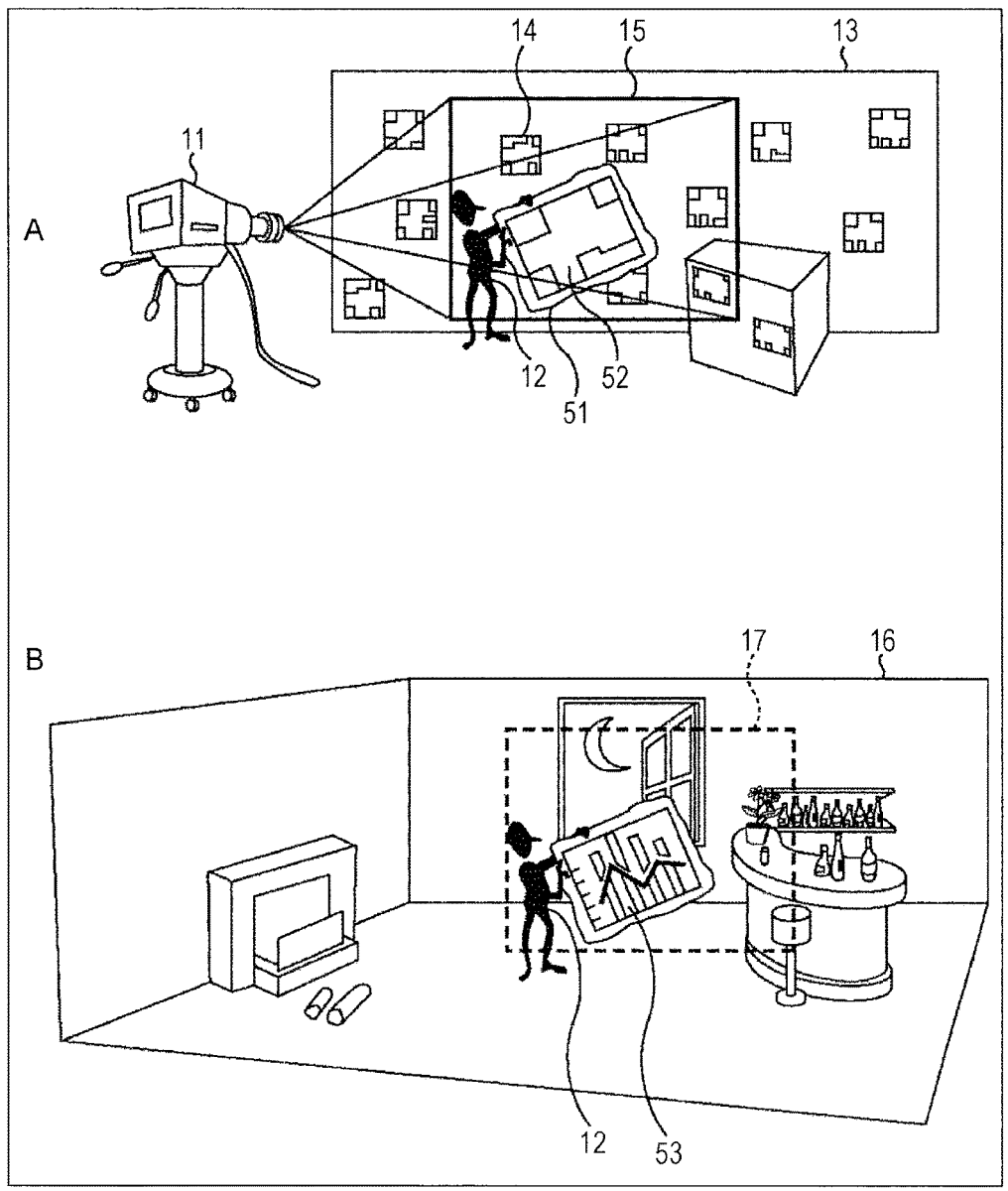
FIG. 8 is a diagram for explaining a chroma-key image capturing situation for a handheld board.

Referring now to FIG. 8, a second embodiment of an image processing system to which the present technique is applied is described.

FIG. 8 shows a chroma-key image capturing situation for three-dimensional position adjustment and a handheld board (a virtual card) in a three-dimensional space where markers 14 are three-dimensionally placed.

In the second embodiment, a three-dimensional image to be synthesized should be moved when the camera 11 is moved or rotated, as in the first embodiment described above with reference to FIG. 1. Therefore, motion and change in the orientation of the camera 11 should be acquired, and image synthesis needs to be performed in accordance with the change. In view of this, an image of markers 14 having their three-dimensional positions measured and a person 12 is captured for positioning in a three-dimensional space, and a projective transform matrix representing the relationship between the camera 11 that is capturing images and the three-dimensional space needs to be calculated based on the markers 14.

B in FIG. 8 shows an image generated by synthesizing a room and furniture placed in the three-dimensional space through a chroma-key process, using the projective transform matrix representing the relationship between the camera 11 and the three-dimensional space.

The room, the furniture, and the like shown in B in FIG. 8 move in accordance with the projective transform matrix estimated based on the markers 14 in A in FIG. 8, and accordingly, a synthetic image that changes with the position and the orientation of the camera 11 and does not show artificiality can be obtained.

Further, in A in FIG. 8, the person 12 is holding an explanatory board 51 to which a floating marker 52 is attached. Unlike the markers 14 (anchored markers) anchored to a wall surface 13, the floating marker 52 is not used for calculating a projective transform matrix, and is floating in the three-dimensional space, being in the form of a handheld board to be used by the person 12 providing commentary. In B in FIG. 8, the floating marker 52 shown in A in FIG. 8 is replaced with a substitute image 53 in which graphs are drawn to assist the person 12 in providing commentary.

That is, the floating marker 52 can be displayed on an output image 17 without artificiality by calculating the position and the posture thereof in the three-dimensional space positioned by the anchored markers 14, and can smoothly interact with other objects placed in the three-dimensional space.

An image processing system that performs such image processing is described below.

Figure 9:
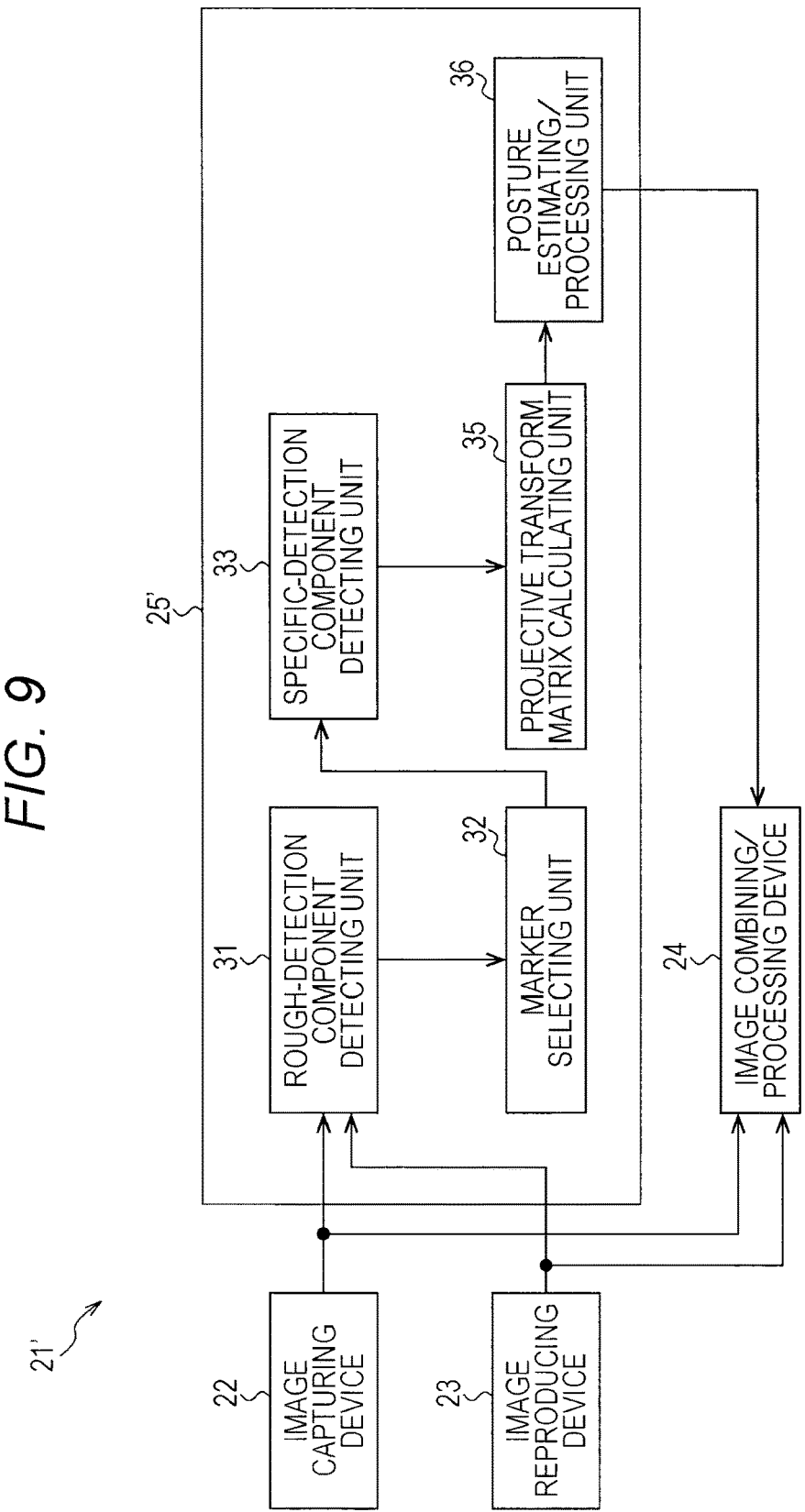
FIG. 9 is a block diagram showing an example structure of a second embodiment of an image processing system to which the present technique is applied.

FIG. 9 is a block diagram showing an example structure of the second embodiment of an image processing system to which the present technique is applied.

As shown in FIG. 9, like the image processing system 21 shown in FIG. 2, an image processing system 21' includes an image capturing device 22, an image reproducing device 23, and an image combining/processing device 24, and a marker position estimating unit 25' includes a rough-detection component detecting unit 31, a marker selecting unit 32, and a specific-detection component detecting unit 33. However, the image processing system 21' differs from the image processing system 21 in that the marker position estimating unit 25' includes a projective transform matrix calculating unit 35 and a posture estimating/processing unit 36.

The projective transform matrix calculating unit 35 calculates a projective transform matrix, using the results of specific detection performed on all the anchored markers 14 by the specific-detection component detecting unit 33.

The posture estimating/processing unit 36 performs a process of estimating the posture of the floating marker 52, using the floating marker 52 specifically detected by the specific-detection component detecting unit 33.

Figure 10:
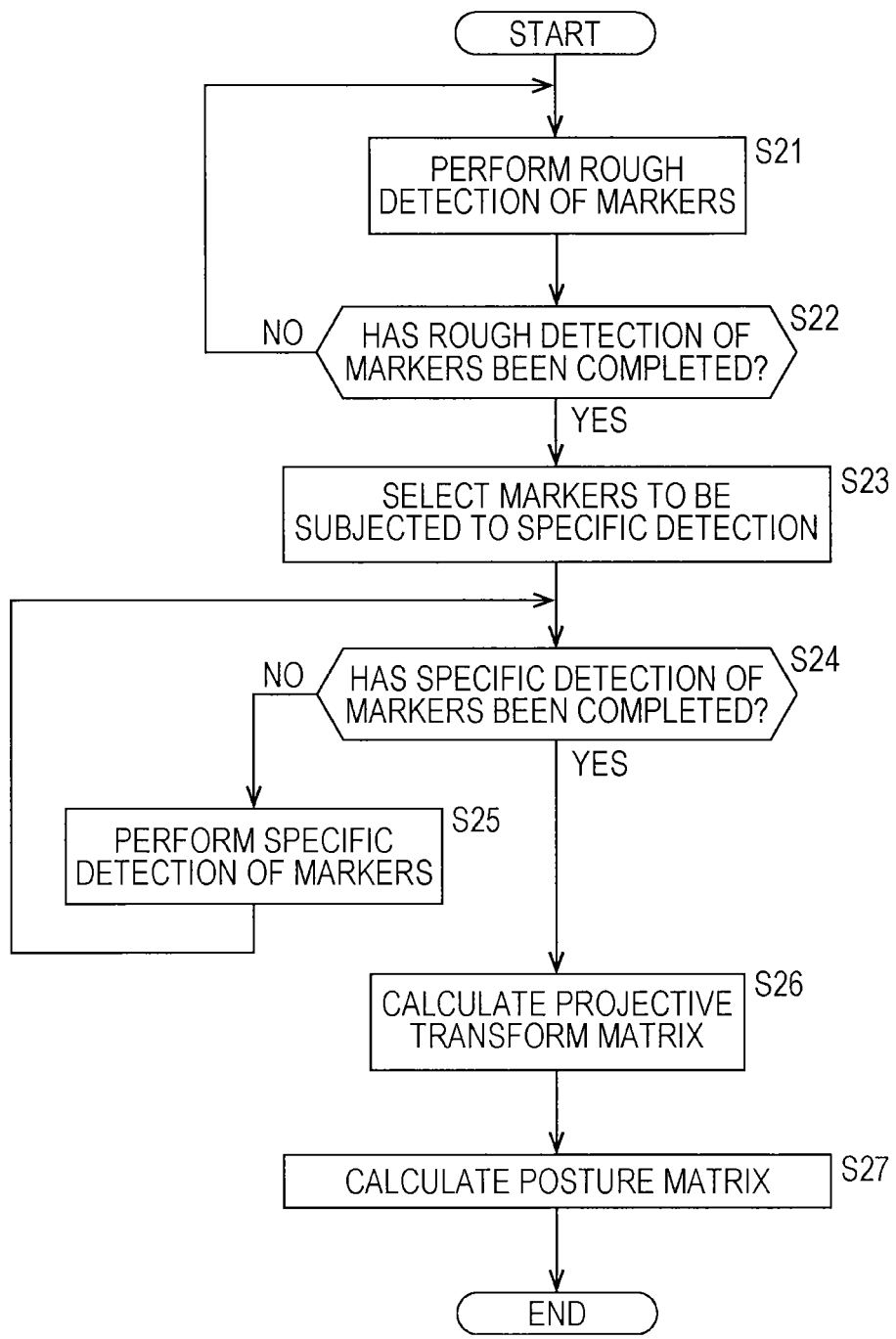
FIG. 10 is a flowchart for explaining a marker position estimating process.

Referring now to the flowchart in FIG. 10, the marker position estimating process to be performed by the marker position estimating unit 25' is described.

The procedures in steps S21 and S22 are the same as the procedures in steps S11 and S12 in FIG. 6, and therefore, explanation of them is not repeated herein.

In step S23, from among the markers 14 detected by the rough-detection component detecting unit 31 in step S11, the marker selecting unit 32 selects a predetermined number of markers 14 to be subjected to the specific detection by the specific-detection component detecting unit 33. In determining the markers to be subjected to the specific detection, the floating marker 52 is determined to be invariably subjected to the specific detection. As for the anchored markers 14, the predetermined number of markers 14 to be selected is determined from the processing load, the computing power, the processing speed, and the like of the specific-detection component detecting unit 33, and which markers 14 are to be selected will be described later with reference to FIG. 11.

In step S24, the specific-detection component detecting unit 33 determines whether the specific detection of the markers 14 has been completed. For example, if the specific detection is performed on all the predetermined number of markers 14 selected by the marker selecting unit 32 as the markers to be subjected to the specific detection in step S23, the specific-detection component detecting unit 33 determines that the specific detection of the markers 14 has been completed.

If the specific-detection component detecting unit 33 in step S24 determines that the specific detection of the markers 14 has not been completed yet, the process moves on to step S25.

In step S25, using the specific-detection components of the markers 14, the specific-detection component detecting unit 33 performs the specific detection of the markers 14 to specifically detect the markers 14 from the captured image 15, as in step S15 in FIG. 6.

After the procedure in step S25, the process returns to step S24, and the procedure in step S25 is repeated until the specific detection of the markers 14 is determined to have been completed in step S24. If the specific detection of the markers 14 is determined to have been completed in step S24, the process moves on to step S26.

In step S26, The projective transform matrix calculating unit 35 calculates a projective transform matrix, using the results of specific detection performed on all the anchored markers 14 by the specific-detection component detecting unit 33 in step S25.

As described above, the correspondence relationships of the specific-detection components, and the homography matrix H representing the coordinate transform of the captured image 15 are used as the results of the detection performed by the specific-detection component detecting unit 33. A case where the correspondence relationships of the specific-detection components are output as the results of the detection performed by the specific-detection component detecting unit 33 in step S25 is now described.

As for a large number of specific points in anchored markers 14, the correspondence relationships between the coordinates $(x_i, y_i)$ in the marker original image 43 and the coordinates $(u_i, v_i)$ in the captured image 15 are input to the projective transform matrix calculating unit 35 from the specific-detection component detecting unit 33. With the marker IDs of the respective anchored markers 14, the coordinates $(x_i, y_i)$ in the corresponding marker original image 43 are connected to the coordinates $(X_i, Y_i, Z_i)$ in the three-dimensional space defined by the anchored markers 14. Accordingly, the projective transform matrix calculating unit 35 can determine the correspondence relationships between the coordinates $(u_i, v_i)$ in the captured image 15 and the coordinates $(X_i, Y_i, Z_i)$ in the three-dimensional space defined by the anchored markers 14.

That is, the transform equation for the coordinate transform from the coordinates $(X_i, Y_i, Z_i)$ in the three-dimensional space into the coordinates $(u_i, v_i)$ in the captured image 15 is expressed by the following equation (15).

[Mathematical Formula 15]

$$\begin{bmatrix} w_i u_i \\ w_i v_i \\ w_i \end{bmatrix} = \begin{bmatrix} p_{00} & p_{01} & p_{02} & p_{03} \\ p_{10} & p_{11} & p_{12} & p_{13} \\ p_{20} & p_{21} & p_{22} & p_{23} \end{bmatrix} \begin{bmatrix} X_i \\ Y_i \\ Z_i \\ 1 \end{bmatrix} \quad (15)$$

In the equation (15), p00 through p23 are the projective transform matrix P to be determined in step S26. Since there is a degree of freedom in the constant factor in the equation (15), the equation (16) shown below is obtained by transforming the equation (15), with $p_{2\,3}$ being 1.

[Mathematical Formula 16]

$$\begin{bmatrix} X_i & Y_i & Z_i & 1 & 0 & 0 & 0 & 0 & -u_i X_i & -u_i Y_i & -u_i Z_i \\ 0 & 0 & 0 & 0 & X_i & Y_i & Z_i & 1 & -v_i X_i & -v_i Y_i & -v_i Z_i \end{bmatrix} \begin{bmatrix} p_{00} \\ p_{01} \\ p_{02} \\ p_{03} \\ p_{10} \\ p_{11} \\ p_{12} \\ p_{13} \\ p_{20} \\ p_{21} \\ p_{22} \end{bmatrix} = \begin{bmatrix} u_i \\ v_i \end{bmatrix} \quad (16)$$

Since there are correspondence relationships between a large number of coordinates $(u_i, v_i)$ in the captured image 15 and a large number of coordinates $(X_i, Y_i, Z_i)$ in the three-dimensional space, the projective transform matrix calculating unit 35 in step S26 determines the elements p00 through p23 of the projective transform matrix P by the method of least squares, and outputs the projective transform matrix P.

In step S27, the posture estimating/processing unit 36 calculates a posture matrix, using the projective transform matrix P calculated by the projective transform matrix calculating unit 35 in step S26.

That is, for each floating marker 52, the correspondence relationships between the coordinates $(x_i, y_i)$ of the floating marker 52 in the original image and the coordinates $(u_i, v_i)$ in the captured image 15 are input to the posture estimating/processing unit 36 from the specific-detection component detecting unit 33 with respect to a large number of specific points in the floating marker 52. The projective transform matrix P calculated in step S26 by the projective transform matrix calculating unit 35 using the anchored markers 14 is also input to the posture estimating/processing unit 36. The marker IDs of the anchored markers 14 and the floating marker 52 are further input to the posture estimating/processing unit 36.

Here, the coordinates of the floating marker 52 in the original image is three-dimensionally assumed to be $(x_i, y_i, 0)$, and a rotation matrix R and a translation vector t are applied to the coordinates, to place the coordinates in the three-dimensional space defined by the anchored markers 14. As a result, through the coordinate transform expressed by the equation (17) shown below, the coordinates $(x_i, y_i, 0)$ of the floating marker 52 in the original image are transformed into the coordinates $(X_i, Y_i, Z_i)$ in the three-dimensional space defined by the anchored markers 14.

[Mathematical Formula 17]

$$\begin{bmatrix} X_i \\ Y_i \\ Z_i \\ 1 \end{bmatrix} = \begin{bmatrix} r_{00} & r_{01} & r_{02} & t_{03} \\ r_{10} & r_{11} & r_{12} & t_{13} \\ r_{20} & r_{21} & r_{22} & t_{23} \\ 0 & 0 & 0 & 0 \end{bmatrix} \begin{bmatrix} x_i \\ y_i \\ 0 \\ 1 \end{bmatrix} \qquad (17)$$

With the use of the projective transform matrix P determined in step S26 for performing projective transform from the three-dimensional space coordinates $(X_i, Y_i, Z_i)$ into the coordinates $(u_i, v_i)$ in the captured image 15, coordinate transform can be performed according to the transform equation expressed by the equation (15). Accordingly, with the use of the equations (15) and (17), the equation for the transform from the coordinates $(x_i, y_i)$ of the floating marker 52 in the original image into the coordinates $(u_i, v_i)$ in the captured image 15 can be expressed by the following equation (18).

[Mathematical Formula 18]

$$\begin{bmatrix} w_i u_i \\ w_i v_i \\ w_i \end{bmatrix} = \begin{bmatrix} p_{00} & p_{01} & p_{02} & p_{03} \\ p_{10} & p_{11} & p_{12} & p_{13} \\ p_{20} & p_{21} & p_{22} & p_{23} \end{bmatrix} \begin{bmatrix} r_{00} & r_{01} & r_{02} & t_{03} \\ r_{10} & r_{11} & r_{12} & t_{13} \\ r_{20} & r_{21} & r_{22} & t_{23} \\ 0 & 0 & 0 & 1 \end{bmatrix} \begin{bmatrix} x_i \\ y_i \\ 0 \\ 1 \end{bmatrix} \qquad (18)$$

If $w_i$ is eliminated to sort out $r_{0\,0}$ through $r_{2\,2}$ and $t_{0\,3}$ through $t_{2\,3}$ in this equation (18), the equation (19) shown below can be obtained, though $r_{0\,2}$ through $r_{2\,2}$ are not included since the z-coordinate of the floating marker 52 in the original image is 0.

[Mathematical Formula 19]

$$\begin{bmatrix} x_i(p_{00}-p_{20}u_i) & y_i(p_{00}-p_{20}u_i) & (p_{00}-p_{20}u_i) & x_i(p_{01}-p_{21}u_i) & y_i(p_{01}-p_{21}u_i) & (p_{01}-p_{21}u_i) & x_i(p_{02}-p_{22}u_i) & y_i(p_{02}-p_{22}u_i) & (p_{02}-p_{22}u_i) \\ x_i(p_{00}-p_{20}v_i) & y_i(p_{00}-p_{20}v_i) & (p_{00}-p_{20}v_i) & x_i(p_{01}-p_{21}v_i) & y_i(p_{01}-p_{21}v_i) & (p_{01}-p_{21}v_i) & x_i(p_{02}-p_{22}v_i) & y_i(p_{02}-p_{22}v_i) & (p_{02}-p_{22}v_i) \end{bmatrix} \times \begin{bmatrix} r_{00} \\ r_{01} \\ t_{03} \\ r_{10} \\ r_{11} \\ t_{13} \\ r_{20} \\ r_{21} \\ t_{23} \end{bmatrix} = \begin{bmatrix} u_i p_{23} - p_{03} \\ v_i p_{23} - p_{13} \end{bmatrix} \qquad (19)$$

The form of the equation (19) is the same as that of the above described equations (2) and (16). Accordingly, if there are five or more correspondence relationships between the coordinates $(x_i, y_i)$ of the floating marker 52 in the original image and the coordinates $(u_i, v_i)$ in the captured image 15, the elements $r_{0\,0}$ through $r_{2\,2}$ excluding $r_{0\,2}$ through $r_{2\,2}$, and the elements $t_{0\,3}$ through $t_{2\,3}$ can be calculated by the method of least squares.

Here, $r_{0\,2}$ through $r_{2\,2}$ can be calculated by using the relationships expressed by the following equations (20), the relationships being characteristic of a rotation matrix.

[Mathematical Formula 20]

$$r_{02} = \text{sqrt}(1 - r_{00}^2 - r_{01}^2)$$

$$r_{12} = \text{sqrt}(1 - r_{10}^2 - r_{11}^2)$$

$$r_{22} = \text{sqrt}(1 - r_{20}^2 - r_{21}^2) \qquad (20)$$

As described above, using the equations (19) and (20), the posture estimating/processing unit 36 in step S27 can calculate the rotation matrix R and the translation vector t for placing the original image of the floating marker 52 identified by a marker ID in the three-dimensional space defined by the anchored markers 14.

A case where the homography matrix H representing the coordinate transform of the captured image 15 is output as the result of the detection performed by the specific-detection component detecting unit 33 in step S25 is now described.

In this case, in step S26, the homography matrix H of each of the anchored markers 14 is input to the projective transform matrix calculating unit 35 from the specific-detection component detecting unit 33. With the marker IDs detected in step S21, the coordinates $(x_i, y_i)$ of the respective anchored markers 14 and the coordinates $(X_i, Y_i, Z_i)$ in the three-dimensional space defined by the anchored markers 14 are expressed by the following equation (21).

[Mathematical Formula 21]

$$\begin{bmatrix} w_i^0 x_i \\ w_i^0 y_i \\ w_i^0 \end{bmatrix} = \begin{bmatrix} g_{00} & g_{01} & g_{02} & g_{03} \\ g_{10} & g_{11} & g_{12} & g_{13} \\ g_{20} & g_{21} & g_{22} & g_{23} \end{bmatrix} \begin{bmatrix} X_i \\ Y_i \\ Z_i \\ 1 \end{bmatrix} \qquad (21)$$

In the equation (21), $g_{2\,0}=g_{2\,1}=0$, $g_{2\,2}=1$, and $w_i^0=1$ in many cases. Also, in the equation (21), the matrix G differs among the markers 14, and an equation (22) using the homography matrix H determined for each of the markers 14 in step S25 can be obtained.

[Mathematical Formula 22]

$$\begin{bmatrix} w_i u_i \\ w_i v_i \\ w_i \end{bmatrix} = \begin{bmatrix} h_{00} & h_{01} & h_{02} \\ h_{10} & h_{11} & h_{12} \\ h_{20} & h_{21} & h_{22} \end{bmatrix} \begin{bmatrix} g_{00} & g_{01} & g_{02} & g_{03} \\ g_{10} & g_{11} & g_{12} & g_{13} \\ g_{20} & g_{21} & g_{22} & g_{23} \end{bmatrix} \begin{bmatrix} X_i \\ Y_i \\ Z_i \\ 1 \end{bmatrix} \quad (22)$$

If the product of the matrix H and the matrix G of the equation (22) obtained for each marker 14 is constant, except for differences in the constant factor, the product is the final projective transform matrix P to be output in step S26. However, the product is normally not constant, and therefore, a matching process needs to be performed.

In the matching process, if the results of the specific detection process in step S25 for the respective markers 14 are equally reliable, for example, representative point positions $(X_i, Y_i, Z_i)$ are prepared for each marker 14, an excess equation equivalent to the above equation (16) is established from the relationships with $(u_i, v_i)$ obtained according to the equation (22), and the final projective transform matrix P is calculated by the method of least squares.

If the reliability varies among the markers 14, on the other hand, the number of representative points is increased or decreased in accordance with the reliability, the above equation (16) is established, and the final projective transform matrix P is then calculated by the method of least squares.

In step S27, the homography matrix H for each floating marker 52, the projective transform matrix P determined by the projective transform matrix calculating unit 35 in step S26, and the marker IDs of the anchored markers 14 and the floating marker 52 are input to the posture estimating/processing unit 36. As the z-coordinate of the floating marker 52 in the original image is 0, the equation (18) that is the transform equation for transforming the coordinates $(x_i, y_i)$ of the floating marker 52 in the original image into the coordinates $(u_i, v_i)$ in the captured image 15 is expressed by the equation (23) shown below.

[Mathematical Formula 23]

$$\begin{bmatrix} w_i u_i \\ w_i v_i \\ w_i \end{bmatrix} = \begin{bmatrix} p_{00} & p_{01} & p_{02} & p_{03} \\ p_{10} & p_{11} & p_{12} & p_{13} \\ p_{20} & p_{21} & p_{22} & p_{23} \end{bmatrix} \begin{bmatrix} r_{00} & r_{01} & r_{03} \\ r_{10} & r_{11} & r_{13} \\ r_{20} & r_{21} & r_{23} \\ 0 & 0 & 1 \end{bmatrix} \begin{bmatrix} x_i \\ y_i \\ 1 \end{bmatrix} \quad (23)$$

Since the form of the equation (23) is the same as that of the above described equation (1), the equation (24) shown below is established, with the degree of freedom k in the constant factor being taken into account.

[Mathematical Formula 24]

$$\begin{bmatrix} h_{00} & h_{01} & h_{02} \\ h_{10} & h_{11} & h_{12} \\ h_{20} & h_{21} & h_{22} \end{bmatrix} = k \begin{bmatrix} p_{00} & p_{01} & p_{02} & p_{03} \\ p_{10} & p_{11} & p_{12} & p_{13} \\ p_{20} & p_{21} & p_{22} & p_{23} \end{bmatrix} \begin{bmatrix} r_{00} & r_{01} & t_{03} \\ r_{10} & r_{11} & t_{13} \\ r_{20} & r_{21} & t_{23} \\ 0 & 0 & 1 \end{bmatrix} \quad (24)$$

The equation (24) can be transformed in the equation (25) shown below, and can be turned into the equation (26).

[Mathematical Formula 25]

$$\begin{bmatrix} h_{00} & h_{01} & h_{02} \\ h_{10} & h_{11} & h_{12} \\ h_{20} & h_{21} & h_{22} \end{bmatrix} = k \left( \begin{bmatrix} p_{00} & p_{01} & p_{02} \\ p_{10} & p_{11} & p_{12} \\ p_{20} & p_{21} & p_{22} \end{bmatrix} \begin{bmatrix} r_{00} & r_{01} & t_{03} \\ r_{10} & r_{11} & t_{13} \\ r_{20} & r_{21} & t_{23} \end{bmatrix} \begin{bmatrix} 0 & 0 & p_{03} \\ 0 & 0 & p_{13} \\ 0 & 0 & p_{23} \end{bmatrix} \right) =$$

$$k \left( \begin{bmatrix} p_{00} & p_{01} & p_{02} \\ p_{10} & p_{11} & p_{12} \\ p_{20} & p_{21} & p_{22} \end{bmatrix} \begin{bmatrix} r_{00} & r_{01} & t_{03} + q_{03} \\ r_{10} & r_{11} & t_{13} + q_{13} \\ r_{20} & r_{21} & t_{23} + q_{23} \end{bmatrix} \right) \quad (25)$$

[Mathematical Formula 26]

$$k \begin{bmatrix} r_{00} & r_{01} & t_{03}+q_{03} \\ r_{10} & r_{11} & t_{13}+q_{13} \\ r_{20} & r_{21} & t_{23}+q_{23} \end{bmatrix} = \begin{bmatrix} p_{00} & p_{01} & p_{02} \\ p_{10} & p_{11} & p_{12} \\ p_{20} & p_{21} & p_{22} \end{bmatrix}^{-1} \begin{bmatrix} h_{00} & h_{01} & h_{02} \\ h_{10} & h_{11} & h_{12} \\ h_{20} & h_{21} & h_{22} \end{bmatrix} \quad (26)$$

In the equation (26), $q_{0\;3}$ through $q_{2\;3}$ are values that are calculated according to the following equation (27).

[Mathematical Formula 27]

$$\begin{bmatrix} q_{03} \\ q_{13} \\ q_{23} \end{bmatrix} = \begin{bmatrix} p_{00} & p_{01} & p_{02} \\ p_{10} & p_{11} & p_{12} \\ p_{20} & p_{21} & p_{22} \end{bmatrix}^{-1} \begin{bmatrix} p_{03} \\ p_{13} \\ p_{23} \end{bmatrix} \quad (27)$$

Here, the equations (28) shown below are determined from the characteristics of the rotation matrix, and accordingly, k on the left-hand side can be calculated by calculating the right-hand side of the equation (25).

[Mathematical Formula 28]

$$r_{00}^2 + r_{10}^2 + r_{20}^2 = 1$$

$$r_{01}^2 + r_{11}^2 + r_{21}^2 = 1 \quad (28)$$

In this manner, the elements $r_{0\;0}$ through $r_{2\;2}$ excluding $r_{0\;2}$ through $r_{2\;2}$, and the elements $t_{0\;3}$ through $t_{2\;3}$ can be calculated. Further, with the use of the relationships expressed by the above described equations (20), which are characteristic of the rotation matrix, $r_{0\;2}$ through $r_{2\;2}$ can be calculated.

Accordingly, using the equations (19) and (20), the posture estimating/processing unit 36 in step S27 can calculate the rotation matrix R and the translation vector t for placing the original image of the floating marker 52 identified by a marker ID in the three-dimensional space defined by the anchored markers 14.

Figure 11:
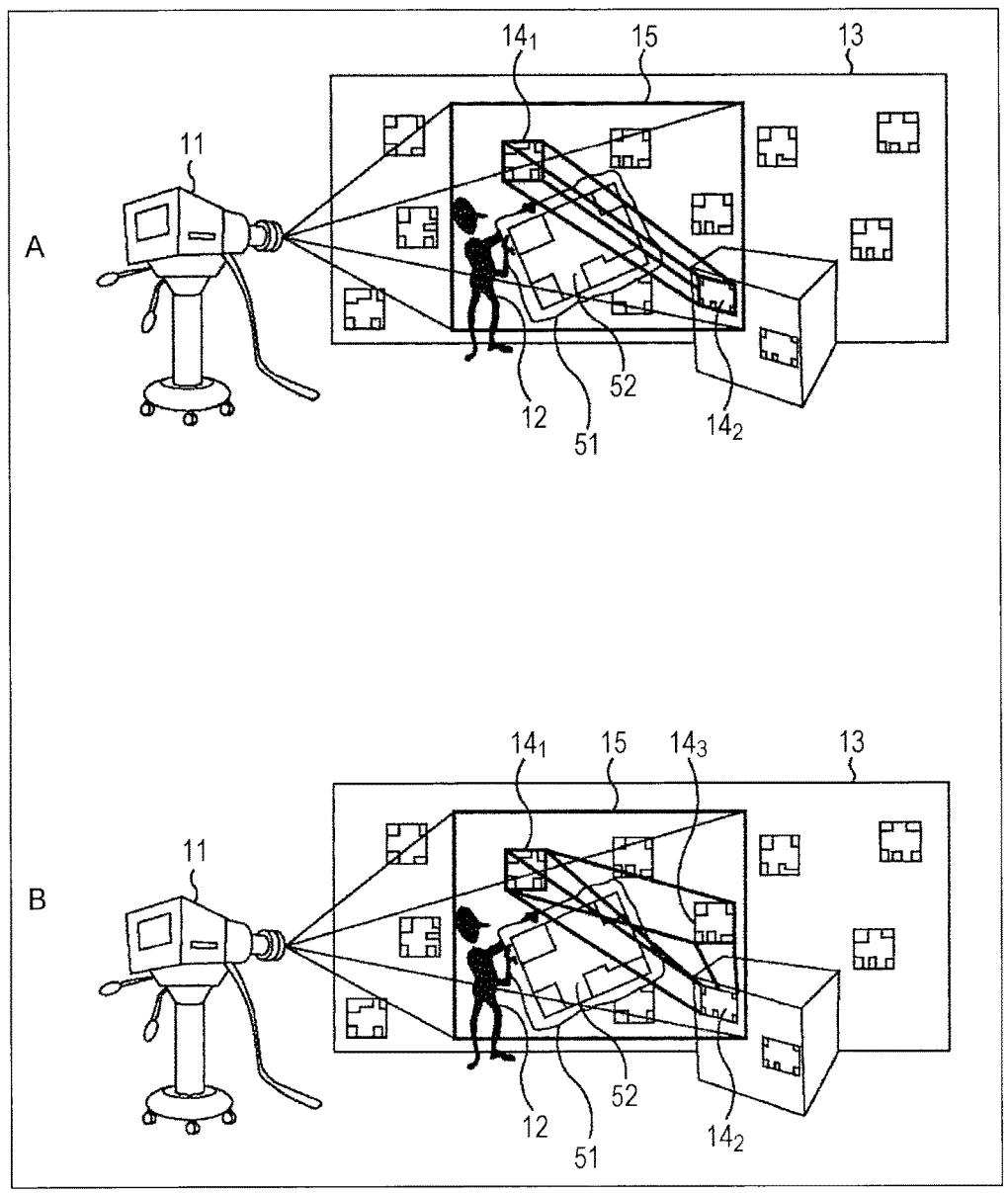
FIG. 11 is a diagram for explaining a predetermined number of markers selected as the markers to be subjected to specific detection.

Referring now to FIG. 11, a predetermined number of markers 14 selected by the marker selecting unit 32 as the markers to be subjected to specific detection are described.

In the image processing system 21', if all the markers are processed, the computation load increases as the number of processes increases. However, even when the number of processes increases, the floating markers 52 cannot be eliminated, because the floating markers 52 are used for specific purposes set for the respective marker IDs thereof, such as a handheld board for explanation. As for the anchored markers 14, on the other hand, the number of markers 14 to be processed may be small, as long as the relationship between the three-dimensional space defined by the anchored markers 14 and the captured image 15 is accurately determined.

As described above with reference to FIG. 7, the relationships between the background image 16 and the markers 14 are determined in the image processing system 21. Therefore, markers 14 are selected in accordance with the number of processable markers so as to maximize the area based on the relationships among planes. In the image processing system 21', on the other hand, so as to estimate a three-dimensional space in a more stable manner, markers 14 are selected so that the volume of the three-dimensional space defined by the anchored markers 14 becomes as large as possible.

In a case where the number of processable markers among the anchored markers 14 is one, for example, the marker 14 located in the center of the captured image 15 or the marker 14 largest in size in the image is selected.

In a case where the number of processable markers among the anchored markers 14 is two, it is most preferable to select the two markers 14 that are spatially farthest from each other and are located at a distance from each other in the depth direction. That is, in the situation shown in A in FIG. 11, a marker $14_1$ and a marker $14_2$ that are spatially farthest from each other and are located at a distance from each other in the depth direction.

In a case where the number of processable markers among the anchored markers 14 is three, it is most preferable to select markers 14 so as to maximize the volume of the space defined by these markers 14. In the situation shown in B in FIG. 11, the marker $14_1$, the marker $14_2$, and a marker $14_3$ are selected.

As the marker selecting unit 32 selects optimum markers 14 from among a large number of markers 14 in the above manner, the relationship between the three-dimensional space and the captured image 15 can be estimated with high accuracy, and the computation load can be reduced. It should be noted that the floating markers 52 are used not only in a case where the markers 14 are three-dimensionally placed as shown in FIG. 8, but also in a case where the markers 14 are two-dimensionally placed as shown in FIG. 1, for example.

Figure 12:
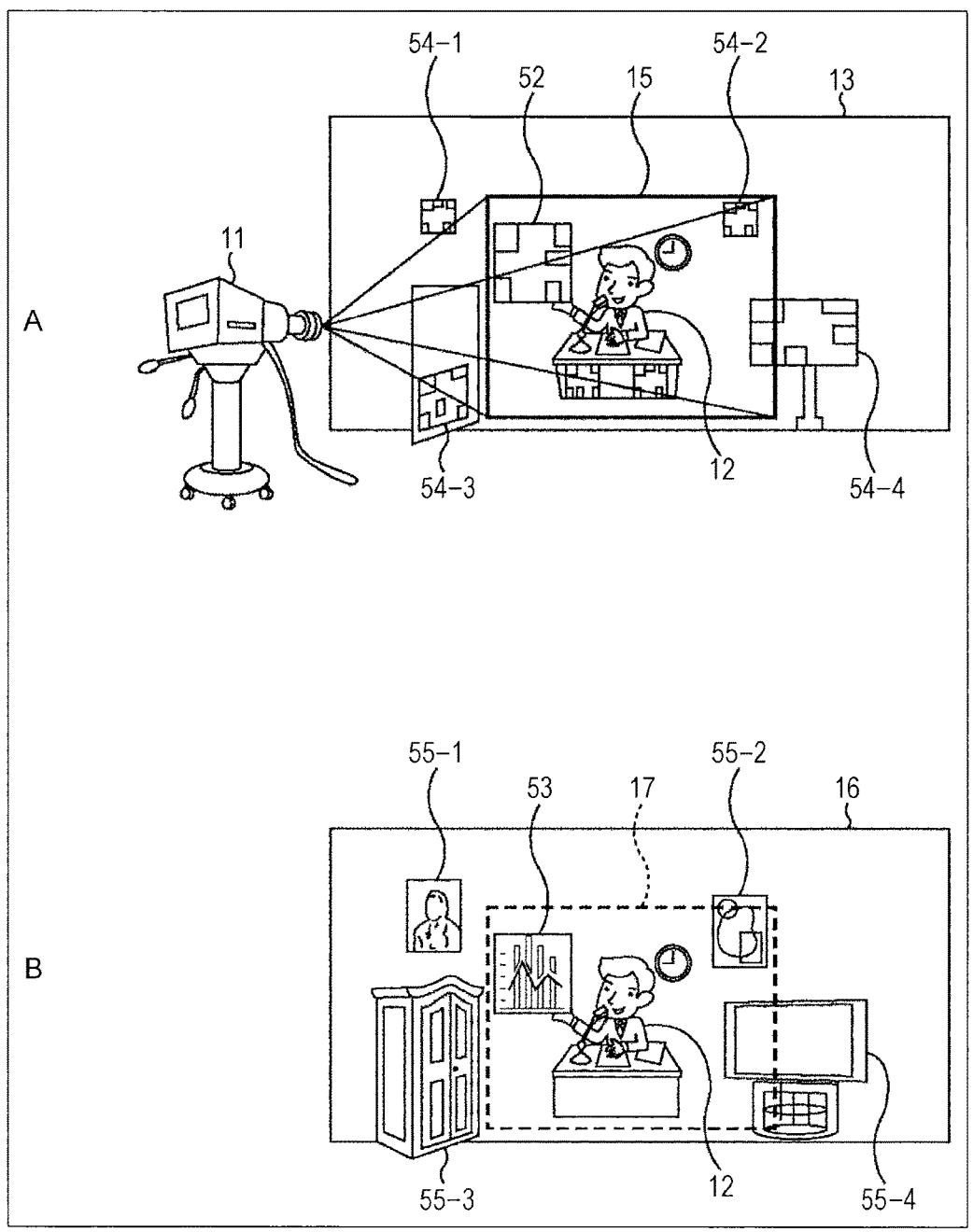
FIG. 12 is a diagram for explaining a marker layout for placing a virtual object in a real space.

Referring now to FIG. 12, the following image capturing situation is described. Markers 54 are three-dimensionally placed for three-dimensional position adjustment, and virtual objects 55 are then placed. In the three-dimensional space subjected to the position adjustment, a substitute image 53 indicated by a floating marker 52 is placed.

In the image capturing situation shown in A in FIG. 12, markers 54-1 through 54-4 are placed on the wall surface 13. As shown in B in FIG. 12, corresponding virtual objects 55-1 through 55-4 are placed so as to cut out or hide the markers 54-1 through 54-4, and the image is output as it is, except for the virtual objects 55-1 through 55-4.

In a case where the virtual objects 55-1 through 55-4 are synthesized in accordance with the markers 54-1 through 54-4 as described above, the output image 17 shows artificiality unless the virtual objects 55-1 through 55-4 are moved in accordance with motion of the camera 11. As shown in B in FIG. 12, images of a closet, a television set, and paintings are synthesized as the virtual objects 55-1 through 55-4 in the real space by computer graphics. In this manner, a highly expressive image can be produced.

This image processing can be realized by using the image processing system 21' shown in FIG. 9, or the rough-detection component detecting unit 31, the marker selecting unit 32, the specific-detection component detecting unit 33, the projective transform matrix calculating unit 35, and the posture estimating/processing unit 36.

However, this image processing differs from the image processing described above with reference to FIG. 8, in that the markers 54 are not limited by a chroma-key process. Accordingly, it is possible to create markers effectively using colors.

Figure 13:
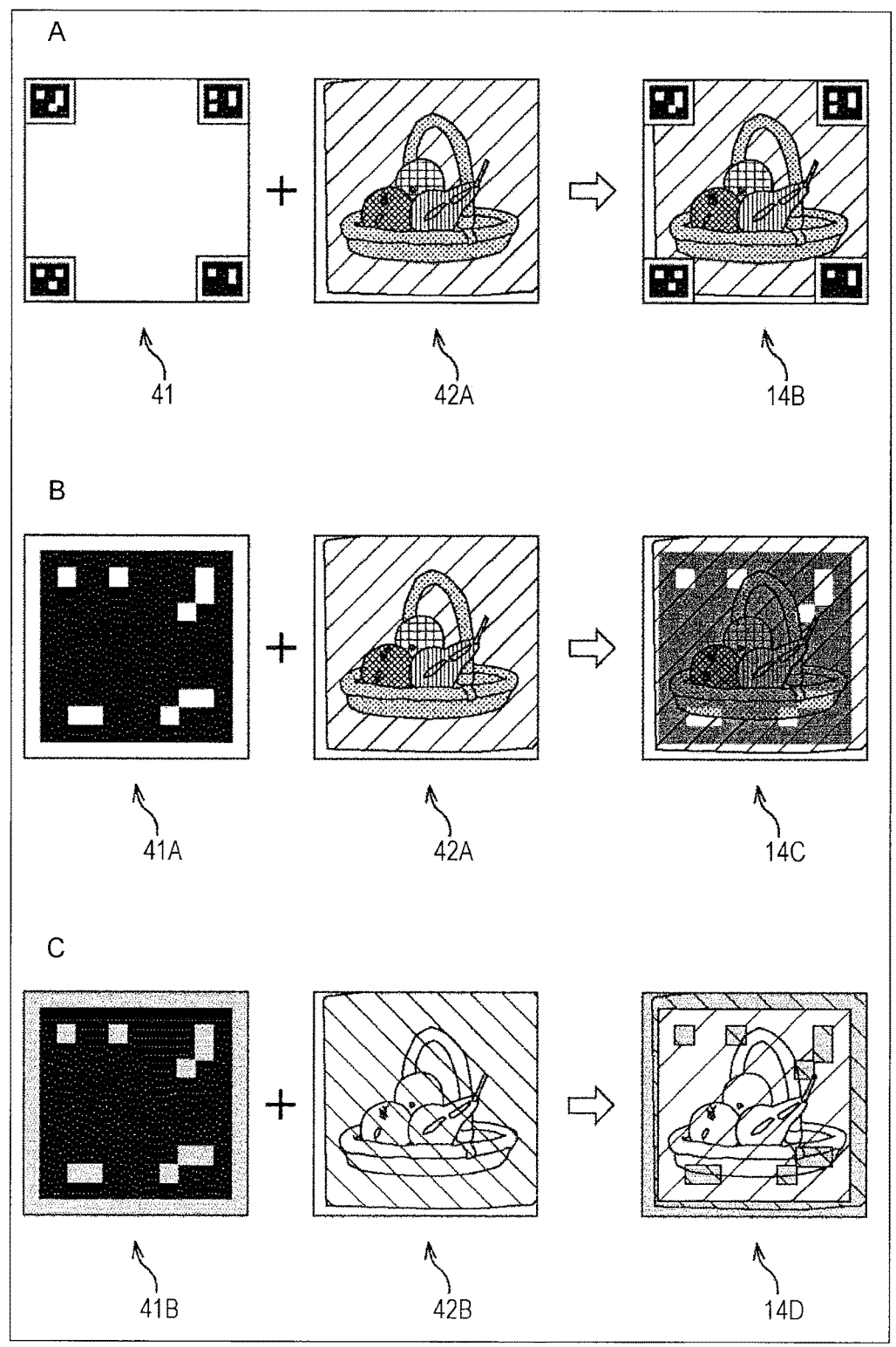
FIG. 13 is a diagram showing modifications of markers.

Referring now to FIG. 13, modifications of the markers 14 are described.

A in FIG. 13 shows a marker 14B having a multicolor specific-detection component. The marker 14B is generated by making a specific-detection component (a specific-detection image 42A) a multicolor component in a marker 14 in which rough-detection components and the specific-detection component spatially coexist as shown in A in FIG. 3. With specific-detection components, highly-accurate correspondence relationship estimation is expected, and detection with multicolor specific-detection components can reduce correspondence errors and increase the accuracy, compared with detection with single-color correspondence points.

B in FIG. 13 shows a marker 14C that has a multicolor specific-detection component (the specific-detection image 42A) in a marker in which rough-detection components and the specific-detection component coexist through modulation as shown in A in FIG. 5. With the marker 14C, correspondence errors in correspondence point detection can also be reduced, and accordingly, the accuracy can be increased.

C in FIG. 13 shows a marker 14D generated by separating rough-detection components and a specific-detection component in a color space, and then mixing the rough-detection components and the specific-detection component. In the marker 14D, the specific-detection component (a specific-detection image 42B) is assigned to a luminance signal including a high-frequency component, and the rough-detection components (a rough-detection image 41B) are assigned to a chrominance component that has a possibility of attenuation in high-frequency regions. Accordingly, both components can coexist in the marker 14D, as the ease of separation between the rough-detection components and the specific-detection component, and the characteristic requirement for a detailed image of the specific-detection component are taken into consideration.

As described above, in the image processing systems 21 and 21' to which the present technique is applied, the markers 14 in which the rough-detection components and the specific-detection components coexist are used, so that the marker detection process can be divided into a marker rough-detection component detection process and a marker specific-detection component detection process. At the time of detection of rough-detection components, the types and the layout state of the markers 14 are determined, and a marker selection process can be performed to select only the markers 14 that need to be subjected to the specific-detection component detection process. Accordingly, the specific-detection component detection process is performed only on the markers 14 that need to be subjected to the specific-detection component detection process. Thus, the computation load can be reduced without any decrease in accuracy.

Specifically, the process of detecting the markers 14 can be divided into rough detection that requires a small computation load but has low location accuracy, and specific detection that requires a large computation load but has high location accuracy. Accordingly, even when an image of markers densely placed in a space is captured, only the necessary markers 14 are selected through the rough detection and are then subjected to the highly-accurate specific detection. Thus, the positions and the postures of the markers 14 relative to the camera 11 are estimated with high accuracy and a small computation load.

Although two-dimensional codes are used as the rough-detection components of the markers 14 in the above described embodiments, the rough-detection components of the markers 14 are not necessarily coded. For example, simple pattern matching with a low processing load in detection may be used to detect the marker IDs in accordance with patterns. Also, the markers 14 are not necessarily rectangular in shape, and may have polygonal or circular shapes. In that case, the polygonal shapes or the circular shapes are preferably provided with feature points indicating the inclination of the figures so that the postures of the markers 14 can be estimated.

In the above described embodiments, block matching is used as the method of detecting the specific-detection components of the markers 14. However, any method other than block matching can be employed, as long as the correspondence relationships between the captured image 15 and the marker original image 43 with respect to the specific points as the specific-detection components can be determined. For example, it is possible to employ a method by which the original image is learned in advance, and the correspondence relationships between the specific points in the captured image 15 and the marker original image 43 are calculated using the results of the learning.

Further, in the above described embodiments, markers 14 are selected based on the largest area or the largest volume in the marker selection process. Other than that, it is possible to employ a marker selection method by which relationships between layouts of the markers 14 and degrees of estimation accuracy are simulated by a computer, and optimum markers 14 are selected with the use of an optimum marker layout database prepared in advance.

The markers 14 are normally in blue, and images of the markers 14 placed in front of a blue background are supposed to be captured by the camera 11, with the chroma-key process described above with reference to A in FIG. 1 being taken into consideration. In the image shown as a synthesis result in B in FIG. 1, the markers 14 are supposed to be removed by a chroma-key process, and the markers 14 are not necessarily in a single color or blue.

It should be noted that the respective processes described above with reference to the flowcharts are not necessarily carried out in chronological order in accordance with the sequences shown as the flowcharts, but include procedures to be carried out in parallel or independently of one another (such as parallel procedures or object-based procedures). The program may be executed by one CPU, or may be executed in a distributive manner by more than one CPU. In this specification, a system means an entire apparatus formed with more than one device.

The above described series of processes (information processing methods) can be performed by hardware, and can also be performed by software. In a case where the series of processes are performed by software, the program that forms the software may be installed in a computer incorporated into special-purpose hardware, or may be installed from a program recording medium into a general-purpose personal computer or the like that can execute various kinds of functions by installing various kinds of programs.

FIG. 14 is a block diagram showing an example structure of the hardware of a computer that performs the above described series of processes in accordance with a program.

In the computer, a CPU (Central Processing Unit) 101, a ROM (Read Only Memory) 102, and a RAM (Random Access Memory) 103 are connected to one another by a bus 104.

An input/output interface 105 is further connected to the bus 104. An input unit 106 formed with a keyboard, a mouse, a microphone, or the like, an output unit 107 formed with a display, a speaker, or the like, a storage unit 108 formed with a hard disk, a nonvolatile memory, or the like, a communication unit 109 formed with a network interface or the like, and a drive 110 that drives a removable medium 111 such as a magnetic disk, an optical disk, a magnetooptical disk, or a semiconductor memory are connected to the input/output interface 105.

In the computer having the above described structure, the CPU 101 loads the program stored in the storage unit 108 into the RAM 103 via the input/output interface 105 and the bus 104, and executes the program, so that the above described series of processes are performed.

The program to be executed by the computer (the CPU 101) is recorded on the removable medium 111, which is a packaged medium such as a magnetic disk (including a flexible disk), an optical disk (such as a CD-ROM (Compact Disc-Read Only Memory) or a DVD (Digital Versatile Disc)), an magnetooptical disk, or a semiconductor memory, and is provided via a wired or wireless transmission medium such as a local area network, the Internet, or digital satellite broadcasting.

The program can be installed into the storage unit 108 via the input/output interface 105 when the removable medium 111 is mounted on the drive 110. The program can also be received by the communication unit 109 via a wired or wireless transmission medium, and be installed into the storage unit 108. Alternatively, the program may be installed beforehand into the ROM 102 or the storage unit 108.

The present technique can also be in the following forms.

(1)

An image processing device including:

a first detecting unit that detects a plurality of markers shown in an image;

a selecting unit that selects a predetermined number of markers from among the markers detected by the first detecting unit;

a second detecting unit that detects the predetermined number of markers selected by the selecting unit in a more specific manner than the first detecting unit; and an estimating unit that estimates positions and postures of the markers based on a result of the detection performed by the second detecting unit.

(2)

The image processing device of (1), further including an image synthesizing unit that synthesizes a background image to be the background of the object shown in the image based on the positions and the postures of the markers estimated by the estimating unit.

(3)

The image processing device of (1) or (2), wherein the markers each include a first detection component to be used in the detection by the first detecting unit, and a second detection component to be used in the detection by the second detecting unit.

(4)

The image processing device of any of (1) through (3), wherein the predetermined number of markers to be subjected to the detection process by the second detecting unit is determined beforehand based on the processing load on the second detecting unit and the computing power and the processing speed of the image processing device, and the selecting unit selects the predetermined number of markers to be subjected to the detection process by the second detecting unit based on the layout of the markers in the image.

(5)

The image processing device of any of (1) through (4), wherein, when the predetermined number of markers to be subjected to the detection process by the second detecting unit is two, the selecting unit selects the markers farthest from each other, and when the predetermined number of markers to be subjected to the detection process by the second detecting unit is three or greater, the selecting unit selects the markers so as to maximize the area of the polygon having the selected markers at its corners.

(6)

The image processing device of any of (1) through (5), wherein the second detecting unit calculates, as a result of detection of the markers, correspondence relationships between the coordinates of a plurality of specific points in the second detection components of the markers in the image and the coordinates in the marker original image from which the markers originate, and, based on the result of the detection performed by the second detecting unit, the estimating unit calculates, as a result of estimation of the positions and the postures of the markers, a matrix representing the relationships between respective points in the background image and respective points in the plane in which the markers in the image are placed.

(7)

The image processing device of any of (1) through (6), wherein the second detecting unit calculates, as a result of detection of the markers, a first matrix representing the relationships between the coordinates in an image corrected so that the markers shown in the image appear as if captured from the front and the coordinates in the marker original image from which the markers originate, and, based on the result of the detection performed by the second detecting unit, the estimating unit calculates, as a result of estimation of the positions and the postures of the markers, a matrix representing the relationships between respective points in the background image and respective points in the plane in which the markers in the image are placed.

(8)

The image processing device of any of (1) through (7), wherein identification information for identifying the respective markers is embedded in the first detection components.

(9)

The image processing device of any of (1) through (8), wherein the plurality of markers include markers anchored to the space in the image and a marker not anchored to the space in the image, and the types of the markers can be identified by the identification information.

(10)

The image processing device of any of (1) through (9), wherein the selecting unit selects the predetermined number of markers to be subjected to the detection process by the second detecting unit based on a type of marker identified by the identification information.

(11)

The image processing device of any of (1) through (10), further including a calculating unit that calculates correspondence relationships between the coordinates in the image and the coordinates in the space defined by the markers anchored to the space in the image based on the result of the detection performed by the second detecting unit on the markers anchored to the space in the image, and the estimating unit estimates the posture of the marker not anchored to the space in the image based on the result of the detection performed by the second detecting unit and the correspondence relationships calculated by the calculating unit.

(12)

The image processing device of any of (1) through (11), wherein each of the markers is formed by placing two-dimensional codes as the first detection component at the four corners of a natural image as the second detection component.

(13)

The image processing device of any of (1) through (12), wherein each of the markers is formed by modulating a natural image as the second detection component with two-dimensional codes as the first detection component.

(14)

The image processing device of any of (1) through (13), wherein each of the markers has the second detection component basically formed with the same color as the background of the object.

(15)

The image processing device of any of (1) through (14), wherein, when a virtual object is synthesized in accordance with the markers, each of the markers has the second detection component in multiple colors.

(16)

The image processing device of any of (1) through (15), wherein each of the markers is formed by assigning a chrominance component to the first detection component, and a luminance component to the second detection component.

It should be noted that this embodiment are not limited to the above described embodiments, and various modifications may be made to them without departing from the scope of the present disclosure.

REFERENCE SIGNS LIST

11 Camera
12 Person
13 Wall surface
14 Marker
15 Captured image
16 Background image
17 Output image
21 Image processing system
22 Image capturing device
23 Image reproducing device
24 Image combining/processing device
25 Marker position estimating unit
31 Rough-detection component detecting unit
32 Marker selecting unit
33 Specific-detection component detecting unit
34 Estimating/processing unit
41 Rough-detection image
42 Specific-detection image
43 Marker original image
51 Explanatory board 52 Floating marker
53 Substitute image
54 Marker
55 Virtual object

The invention claimed is:

1. An image processing device, comprising:
circuitry configured to:
perform a first detection process to detect a first feature point in an image;
perform a second detection process to detect a second feature point within the first feature point;
control to display an indicator that indicates at least one of the first feature point and the second feature point in the image, wherein
the image includes a plurality of markers,
the circuitry detects the first feature point in the first detection process by detecting one or more markers of the plurality of markers, and
each of the one or more markers of the plurality of markers includes:
a first detection component used in the first detection process, and
a second detection component used in the second detection process; and
transform a detected first detection component of the detected one or more markers so that the perspective view angle of the first detection component changes, wherein
the first detection component comprises two-dimensional codes at four corners of the first detection component and is superimposed on the second detection component comprising a natural image.

2. The image processing device according to claim 1, wherein
the circuitry is further configured to synthesize a background image to be a background of an object shown in the image based on a position and a posture of the second feature point.

3. The image processing device according to claim 1, wherein
a predetermined number of markers of the plurality of markers to be subjected to the second detection process by the circuitry is determined beforehand based on a processing load, computing power and processing speed of the circuitry, and
the circuitry selects the predetermined number of markers of the plurality of markers based on a layout of the markers in the image.

4. The image processing device according to claim 3, wherein
when the predetermined number of markers of the plurality of markers to be subjected to the second detection process is two, the circuitry selects the markers to be subjected to the second detection farthest from each other, and
when the predetermined number of markers of the plurality of markers to be subjected to the second detection process is three or greater, the circuitry selects the markers to be subjected to the second detection so as to maximize an area of a polygon having the selected markers at corners thereof.

5. The image processing device according to claim 3, wherein
the circuitry calculates, as a result of detection of the predetermined number of markers, correspondence relationships between coordinates of a plurality of specific points in the second detection components of the predetermined number of markers in the image and coordinates in a marker original image from which the predetermined number of markers originate, and
the circuitry calculates, based on the result of the second detection process and as a result of estimation of the positions and the postures of the predetermined number of markers, a matrix representing relationships between respective points in the background image and respective points in a plane in which the predetermined number of markers in the image are placed.

6. The image processing device according to claim 3, wherein
the circuitry calculates, as a result of detection of the predetermined number of markers, a first matrix representing relationships between coordinates in an image corrected so that the predetermined number of markers shown in the image appear as if captured from the front and coordinates in a marker original image from which the predetermined number of markers originate, and
the circuitry calculates, based on the result of the second detection process and as a result of estimation of the positions and the postures of the predetermined number of markers, a matrix representing relationships between respective points in the background image and respective points in a plane in which the predetermined number of markers in the image are placed.

7. The image processing device according to claim 1, wherein
identification information for identifying respective markers of the plurality of markers is embedded in the first detection components of the respective markers.

8. The image processing device according to claim 7, wherein
the plurality of markers include markers anchored to a space in the image and a marker not anchored to the space in the image, and types of markers are identifiable by the identification information.

9. The image processing device according to claim 8, wherein
the circuitry selects a predetermined number of markers to be subjected to the second detection process based on a type of a marker identified by the identification information.

10. The image processing device according to claim 9, wherein the circuitry is further configured to:
calculate correspondence relationships between coordinates in the image and coordinates in the space defined by the markers anchored to the space in the image based on the result of the second detection process on the markers anchored to the space in the image, and
estimate a posture of the marker not anchored to the space in the image based on the result of the second detection process and the correspondence relationships.

11. The image processing device according to claim 1, wherein
the circuitry is further configured to control to display an object at a position corresponding to the first feature point.

12. An image processing method, comprising:
detecting a first feature point in an image;
detecting a second feature point within the first feature point;
controlling, to display an indicator that indicates at least one of the first feature point and the second feature point in the image, wherein the image includes a plurality of markers, and the detecting of the first feature point comprises detecting one or more markers of the plurality of markers, wherein each of the one or more markers of the plurality of markers includes:
 a first detection component used in the detecting the first feature point in the image, and
 a second detection component used in the detecting the second feature point; and transforming a detected first detection component of the detected one or more markers so that the perspective view angle of the first detection component changes, wherein the first detection component comprises two-dimensional codes at four corners of the first detection component and is superimposed on the second detection component comprising a natural image.

13. A non-transitory computer readable medium storing computer executable instructions which, when executed by a computer, causes the computer to:

perform a first detection process to detect a first feature point in an image;

perform a second detection process to detect a second feature point within the first feature point;

control to display an indicator that indicates at least one of the first feature point and the second feature point in the image, wherein the image includes a plurality of markers, the computer performs detecting the first feature point in the first detection process by detecting one or more markers of the plurality of markers, and each of the one or more markers of the plurality of markers includes:
 a first detection component used in the first detection process, and
 a second detection component used in the second detection process; and transform a detected first detection component of the detected one or more markers so that the perspective view angle of the first detection component changes, wherein the first detection component comprises two-dimensional codes at four corners of the first detection component and is superimposed on the second detection component comprising a natural image.

* * * * *